(12) United States Patent
Guo et al.

(10) Patent No.: US 11,372,900 B1
(45) Date of Patent: Jun. 28, 2022

(54) ARTIFICIAL INTELLIGENCE-BASED PROPERTY DATA MATCHING SYSTEM

(71) Applicant: CoreLogic Solutions, LLC, Irvine, CA (US)

(72) Inventors: Jia Guo, San Diego, CA (US); Jacques Truong, Trabuco Canyon, CA (US); Pallavi Wankhede, San Diego, CA (US); Susanna Park, Costa Mesa, CA (US); Patrick Jacolenne, Perris, CA (US); Aaron Robert Wepler, Laguna Beach, CA (US); Stanley Wu, San Diego, CA (US)

( * ) Notice: Subject to any disclaimer, the term of this patent is extended or adjusted under 35 U.S.C. 154(b) by 723 days.

(21) Appl. No.: 16/198,654

(22) Filed: Nov. 21, 2018

Related U.S. Application Data

(60) Provisional application No. 62/654,183, filed on Apr. 6, 2018.

(51) Int. Cl.
*G06F 16/28* (2019.01)
*G06Q 50/16* (2012.01)
*G06N 20/00* (2019.01)

(52) U.S. Cl.
CPC ........... *G06F 16/288* (2019.01); *G06N 20/00* (2019.01); *G06Q 50/16* (2013.01)

(58) Field of Classification Search
CPC ........ G06F 16/93; G06Q 10/06; G06Q 30/06; G06Q 50/16
USPC ................................................. 705/313, 314
See application file for complete search history.

(56) References Cited

U.S. PATENT DOCUMENTS

| | | | |
|---|---|---|---|
| 6,581,075 B1 | 6/2003 | Guturu et al. | |
| 7,127,458 B1 * | 10/2006 | Mantripragada | G06Q 10/0875 |
| 7,792,353 B2 * | 9/2010 | Forman | G06N 20/00 |
| | | | 382/224 |
| 7,912,842 B1 * | 3/2011 | Bayliss | G06F 16/215 |
| | | | 707/749 |
| 8,266,023 B2 * | 9/2012 | Moore | G06Q 40/00 |
| | | | 705/31 |
| 8,271,431 B1 * | 9/2012 | Carrington | G06Q 50/18 |
| | | | 707/603 |
| 8,583,562 B1 * | 11/2013 | McDaniel | G06Q 10/10 |
| | | | 705/313 |
| 8,738,479 B1 * | 5/2014 | LaFever | G06Q 40/123 |
| | | | 705/31 |

(Continued)

*Primary Examiner* — Andrew B Whitaker
(74) *Attorney, Agent, or Firm* — Knobbe Martens Olson & Bear LLP

(57) ABSTRACT

A data linking system is described herein that links data records corresponding to a particular real estate property even if there are inconsistencies in the data records, the physical presence of the real estate property has changed over time, and/or the data records use different terminology. In some cases the data records are matched using a trained machine learning model. The data linking system can optionally generate a visualization of the data record linkage via interactive user interfaces. By linking data records despite the issues described above, the data linking system reduces the number of navigational steps a user performs to obtain data associated with a property and/or reduces data processing times. The disclosed system may be used to generate and maintain a comprehensive database of substantially all properties within a jurisdiction, in which a unique identifier is assigned to each property.

18 Claims, 15 Drawing Sheets

(56) References Cited

U.S. PATENT DOCUMENTS

| | | | |
|---|---|---|---|
| 2002/0032626 A1* | 3/2002 | DeWolf | G06Q 30/06 |
| | | | 705/36 R |
| 2005/0210016 A1* | 9/2005 | Brunecky | G06F 16/93 |
| 2010/0135579 A1* | 6/2010 | Newcomer | G06K 9/00483 |
| | | | 382/190 |
| 2012/0005112 A1* | 1/2012 | Woodworth | G06Q 30/0205 |
| | | | 705/313 |
| 2014/0025548 A1* | 1/2014 | Serio | G06Q 40/02 |
| | | | 705/35 |
| 2014/0279972 A1* | 9/2014 | Singh | G06F 16/215 |
| | | | 707/694 |
| 2014/0316908 A1* | 10/2014 | Kalra | G06Q 50/165 |
| | | | 705/14.73 |
| 2015/0170258 A1 | 6/2015 | Kulig et al. | |
| 2015/0242747 A1* | 8/2015 | Packes | G06Q 50/16 |
| | | | 706/17 |
| 2017/0351717 A1 | 12/2017 | Kabra et al. | |
| 2018/0181644 A1 | 6/2018 | Lyons et al. | |
| 2019/0065586 A1* | 2/2019 | Yoshikawa | G06F 40/295 |
| 2019/0236460 A1 | 8/2019 | Jagota et al. | |

\* cited by examiner

ARTIFICIAL INTELLIGENCE-BASED PROPERTY DATA MATCHING SYSTEM

CROSS-REFERENCE TO RELATED APPLICATIONS

This application claims priority under 35 U.S.C. § 119(e) to U.S. Provisional Application No. 62/654,183, entitled "SYSTEM FOR ASSIGNING UNIQUE IDENTIFIERS TO PARCELS OF REAL PROPERTY" and filed on Apr. 6, 2018, which is hereby incorporated by reference herein in its entirety.

BACKGROUND

Data corresponding to real estate property may be stored in many different data stores accessible via a network. For example, tax data associated with a property may be stored in one data store, whereas listing data associated with the property may be stored in another data store. Each data store may include records that identify values for different attributes of a property. For example, one record may identify the address, property owner, deed record date, and/or the like for a property. Values for some property attributes may be present in records in multiple data stores. However, values for other property attributes may only be present in a record in one data store. Thus, a user may be required to navigate to different pages (e.g., content pages, web pages, network pages, etc.) to access the different data stores and obtain, view, and/or process all of the data corresponding to a particular property.

In addition, different data stores may use different identifiers or identifier formats to reference the same property. Thus, it may be difficult to determine whether records in different data stores are referencing the same property or different properties.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system for linking data records. The system comprises a data store comprising a plurality of data records. The system further comprises a computing system comprising one or more computing devices, where the computing system is configured with specific computer-executable instructions to at least: obtain the plurality of data records; determine that a first data record and a second data record in the plurality of data records are duplicative; discard the second data record; obtain master record data from a master record data store, where the master record data comprises property attribute values for a plurality of real estate properties and unique identifiers associated with individual real estate properties in the plurality of real estate properties; analyze the first record data and the master record data using a trained machine learning model trained with one or more labeled data record pairs; determine that the first data record corresponds to a first unique identifier of a first real estate property in the plurality of real estate properties based on the analysis; identify master record data in the master record data store corresponding to the first real estate property based on the first unique identifier; determine that a date associated with the first data record is newer than a date associated with the master record data in the master record data stores that corresponds to the first real estate property; and update the master record data in the master record data store that corresponds to the first real estate property using the first data record.

The system of the preceding paragraph can include any sub-combination of the following features: where the computing system is further configured with specific computer-executable instructions to at least: process a query for the first real estate property received from a user device, and generate user interface data that, when rendered by the user device, causes the user device to display a user interface, where the user interface depicts property attribute values of the first real estate property; where the master record data indicates that the first real estate property is a child property of a second real estate property in the plurality of real estate properties, and where the user interface further depicts a slider that, when moved from a date after creation of the first real estate property to a date before the creation of the first real estate property, causes the user interface to update to depict property attribute values of the second real estate property; where the computing system is further configured with specific computer-executable instructions to at least: determine that the first real estate property and a second real estate property in the plurality of real estate properties share a first property attribute value with the first data record, generate a first feature-based representation of a combination of property attribute values of the first data record and property attribute values of the first real estate property, generate a second feature-based representation of a combination of property attribute values of the first data record and property attribute values of the second real estate property, determine that the first data record and the first real estate property have a match probability above a threshold value based on an application of the first feature-based representation as an input to the trained machine learning model, and determine that the first data record and the second real estate property have a match probability below the threshold value based on an application of the second feature-based representation as an input to the trained machine learning model; where the computing system is further configured with specific computer-executable instructions to at least analyze the first record data and the master record data using artificial intelligence after failing to identify a match between the first data record and the first unique identifier based on a comparison of property attribute values of the first data record with the master record data; where the computing system is further configured with specific computer-executable instructions to at least: determine that a third data record in the plurality of data records does not correspond to any unique identifier, generate a third unique identifier for the third data record, and create a new entry in the master record data store, where the new entry is associated with the third unique identifier and comprises property attribute values of the third data record; where the computing system is further configured with specific computer-executable instructions to at least: analyze a third data record in the plurality of data records and the master record data using the trained machine learning model, obtain an output from the trained machine learning model indicating that the third data record corresponds to the first unique identifier and to a second unique identifier of a second real estate property in the plurality of real estate properties, determine that the trained machine learning model produced a false positive result based on the obtained output, generate a third unique identifier for the third data record, and create a new entry in the master record data store, where the new entry is associated with the third unique identifier and comprises property attribute values of the third data record; where the computing system is further configured with specific computer-executable instructions to at least analyze the first record data and the master record data using artificial intelligence subsequent to a determination that the first data record comprises a minimum amount of information; and where the computing system is further configured with specific computer-executable instructions to at least: determine that a third data record in the plurality of data records does not comprise a minimum amount of information, and store the third data record in a pending file data store in place of attempting to identify a unique identifier that corresponds with the third data record.

Another aspect of the disclosure provides a computer-implemented method of linking data records. The computer-implemented method comprises: as implemented by one or more computing devices configured with specific computer-executable instructions, obtaining a first data record from a data store via a network; obtaining master record data that comprises property attribute values for a first property and a second property, a first unique identifier associated with the first property, and a second unique identifier associated with the second property; analyzing the first data record and the master record data using a trained machine learning model trained with one or more labeled data record pairs; determining that the first data record corresponds to the first unique identifier based on the analysis; determining, subsequent to the determination that the first data record corresponds to the first unique identifier, that at least one property attribute value in the first data record differs from at least one property attribute value of the first property; and updating the at least one property attribute value of the first property using the first data record.

The computer-implemented method of the preceding paragraph can include any sub-combination of the following features: where the computer-implemented method further comprises: receiving a query for the first property from a user device, and generating user interface data that, when rendered by the user device, causes the user device to display a user interface, where the user interface depicts property attribute values of the first property; where the master record data indicates that the first property is a child property of a third property, and where the user interface further depicts a slider that, when moved from a date after creation of the first property to a date before the creation of the first property, causes the user interface to update to depict property attribute values of the third property; where analyzing the first data record and the master record data using a tiered approach further comprises: determining that the first property and the second property share a first property attribute value with the first data record, generating a first feature-based representation of a combination of property attribute values of the first data record and property attribute values of the first property, generating a second feature-based representation of a combination of property attribute values of the first data record and property attribute values of the second property, determining that the first data record and the first property have a match probability above a threshold value based on an application of the first feature-based representation as an input to the trained machine learning model, and determining that the first data record and the second property have a match probability below the threshold value based on an application of the second feature-based representation as an input to the trained machine learning model; where analyzing the first data record and the master record data using a tiered approach further comprises analyzing the first record data and the master record data using artificial intelligence after failing to identify a match between the first data record and the first unique identifier based on a comparison of property attribute values of the first data record with the master record data; where the computer-implemented method further comprises: determining that a second data record obtained from the data store does not correspond to any unique identifier, generating a third unique identifier for the second data record, and creating a new entry in the master record data, where the new entry is associated with the third unique identifier and comprises property attribute values of the second data record; and where the computer-implemented method further comprises: analyzing a second data record and the master record data using a trained machine learning model, obtaining an output from the trained machine learning model indicating that the second data record corresponds to the first unique identifier and to the second unique identifier, determining that the trained machine learning model produced a false positive result based on the obtained output, generating a third unique identifier for the second data record, and creating a new entry in the master record data, where the new entry is associated with the third unique identifier and comprises property attribute values of the second data record.

Another aspect of the disclosure provides non-transitory, computer-readable storage media comprising computer-executable instructions for linking data records, where the computer-executable instructions, when executed by a computer system, cause the computer system to: obtain a first data record, where the first data record comprises a first plurality of property attribute values; determine that the first data record corresponds to a first unique identifier in a plurality of unique identifiers using a trained machine learning model trained with one or more labeled data record pairs, where the first unique identifier is linked to a second plurality of property attribute values, the second plurality of property attribute values associated with a first property and stored in a master record data store; determine that at least one property attribute value in the first plurality of property attribute values differs from at least one property attribute value in the second plurality of property attribute values; and update the at least one property attribute value in the second plurality of property attribute values using the first data record.

The non-transitory, computer-readable storage media of the preceding paragraph can include any sub-combination of the following features: where the computer-executable instructions further cause the computer system to: process a query for the first property received from a user device, and generate user interface data that, when rendered by the user device, causes the user device to display a user interface, where the user interface depicts property attribute values of the first property; where the master record data indicates that the first property is a child property of a second property, and where the user interface further depicts a slider that, when moved from a date after creation of the first property to a date before the creation of the first property, causes the user interface to update to depict property attribute values of the second property; and where the computer-executable instructions further cause the computer system to: determine that the trained machine learning model indicates that a second data record corresponds to the first unique identifier and a second unique identifier in the plurality of unique identifiers, determine that the trained machine learning model produced a false positive result, generate a new unique identifier for the second data record, and update the master record data store to include an entry associated with the new unique identifier and that comprises property attribute values of the second data record.

Another aspect of the disclosure provides a system for matching data records. The system comprises a master record data store configured to store data associated with a plurality of properties. The system further comprises a computing system comprising one or more computing devices, where the computing system is configured to communicate with the master record data store and is configured with specific computer-executable instructions to at least: process a request received from a user device via a network, where the request specifies a data record; identify a first entity and a second entity in the data record; identify a relationship between the first entity and the second entity; identify a context associated with the first entity, the second entity, and the identified relationship using a trained machine learning model trained with one or more data records labeled to identify corresponding contexts; cleanse and standardize data in the data record using one or more rules selected based on the identified context to form a modified data record; determine that the modified data record corresponds to data stored in the master record data store that corresponds to a first property in the plurality of properties; and output an indication of the determination such that the user device receives an indication that the data record matches the first property.

The system of the preceding paragraph can include any sub-combination of the following features: where the indication received by the user device is a user interface, and where the user interface depicts property attribute values of the first property; where the data stored in the master record data store that corresponds to the first property indicates that the first property is a child property of a second property in the plurality of properties, and where the user interface further depicts a slider that, when moved from a date after creation of the first property to a date before the creation of the first property, causes the user interface to update to depict property attribute values of the second property; where the computing system is further configured with specific computer-executable instructions to at least: compare a first property attribute value in the data record with a range of acceptable values, determine that the first property attribute value is outside the range, and remove the first property attribute value from the data record; where the computing system is further configured with specific computer-executable instructions to at least remove extra characters from the data record; where the computing system is further configured with specific computer-executable instructions to at least: identify a first entity and a second entity in the data record using a first trained machine learning model, and identify a relationship between the first entity and the second entity based on an application of the first entity and the second entity as inputs to a second trained machine learning model; where the one or more data records labeled to identify corresponding contexts comprises data records in which entities, relationships between the entities, and the context of the relationships are labeled; where the computing system is further configured with specific computer-executable instructions to at least determine that the modified data record corresponds to the data stored in the master record data store that corresponds to the first property based on a comparison of at least some property attribute values in the modified data record and the data stored in the master record data store that corresponds to the first property; and where the computing system is further configured with specific computer-executable instructions to at least: determine that the first property and a second property in the plurality of properties share a first property attribute value with the modified data record, generate a first feature-based representation of a combination of property attribute values of the modified data record and property attribute values of the first property, generate a second feature-based representation of a combination of property attribute values of the modified data record and property attribute values of the second property, determine that the modified data record and the first property have a match probability above a threshold value based on an application of the first feature-based representation as an input to a first trained machine learning model, and determine that the modified data record and the second property have a match probability below the threshold value based on an application of the second feature-based representation as an input to the first trained machine learning model.

Another aspect of the disclosure provides a computer-implemented method of matching data records. The computer-implemented method comprises: as implemented by one or more computing devices configured with specific computer-executable instructions, obtaining a data record; identifying a context associated with the data record using a trained machine learning model trained with one or more data records labeled to identify corresponding contexts; cleansing data in the data record using one or more rules selected based on the identified context to form a modified data record; standardizing data in the modified data record to form a second modified data record; determining that the second modified data record corresponds to master record data that corresponds to a first property; and causing output of an indication that the data record matches the first property.

The computer-implemented method of the preceding paragraph can include any sub-combination of the following features: where the indication is a user interface, and where the user interface depicts property attribute values of the first property; where the master record data that corresponds to the first property indicates that the first property is a child property of a second property, and where the user interface further depicts a slider that, when moved from a date after creation of the first property to a date before the creation of the first property, causes the user interface to update to depict property attribute values of the second property; where cleansing data further comprises: comparing a first property attribute value in the data record with a range of acceptable values, determining that the first property attribute value is outside the range, and removing the first property attribute value from the data record; where cleansing data further comprises removing extra characters from the data record; where determining that the second modified data record corresponds to master record data that corresponds to a first property further comprises determining that the second modified data record corresponds to the master record data that corresponds to the first property based on a comparison of at least some property attribute values in the second modified data record and the master record data that corresponds to the first property; and where determining that the second modified data record corresponds to master record data that corresponds to a first property further comprises: determining that the first property and a second property share a first property attribute value with the second modified data record, generating a first feature-based representation of a combination of property attribute values of the second modified data record and property attribute values of the first property, generating a second feature-based representation of a combination of property attribute values of the second modified data record and property attribute values of the second property, determining that the second modified data record and the first property have a match probability above a threshold value based on an application of the first feature-based representation as an input to a first trained machine learning model, and determining that the second modified data record and the second property have a match probability below the threshold value based on an application of the second feature-based representation as an input to the first trained machine learning model.

Another aspect of the disclosure provides non-transitory, computer-readable storage media comprising computer-executable instructions for matching data records, where the computer-executable instructions, when executed by a computer system, cause the computer system to: obtain a data record; identify a context associated with the data record using a trained machine learning model trained with one or more data records labeled to identify corresponding contexts; modify the data record using one or more rules selected based on the identified context to improve a match rate; determine that the modified data record corresponds to master record data that corresponds to a first property; and generate an output that causes generation of a representation indicating that the data record matches the first property.

The non-transitory, computer-readable storage media of the preceding paragraph can include any sub-combination of the following features: where the representation is a user interface, and where the user interface depicts property attribute values of the first property; where the master record data that corresponds to the first property indicates that the first property is a child property of a second property, and where the user interface further depicts a slider that, when moved from a date after creation of the first property to a date before the creation of the first property, causes the user interface to update to depict property attribute values of the second property; and where the computer-executable instructions further cause the computer system to: determine that the first property and a second property share a first property attribute value with the modified data record, generate a first feature-based representation of a combination of property attribute values of the modified data record and property attribute values of the first property, generate a second feature-based representation of a combination of property attribute values of the modified data record and property attribute values of the second property, determine that the modified data record and the first property have a match probability above a threshold value based on an application of the first feature-based representation as an input to a first trained machine learning model, and determine that the modified data record and the second property have a match probability below the threshold value based on an application of the second feature-based representation as an input to the first trained machine learning model.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
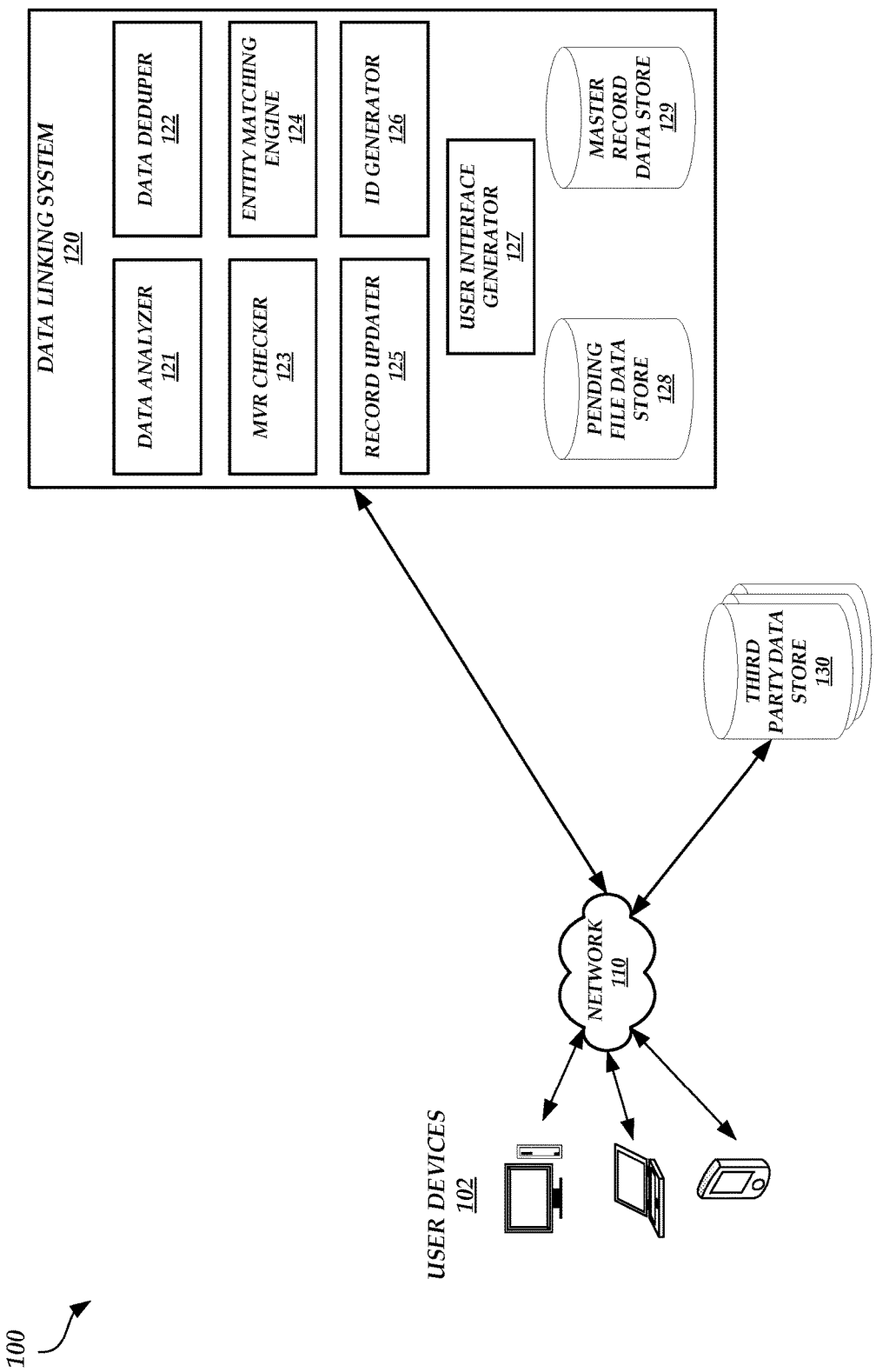
FIG. 1 is a block diagram of an illustrative operating environment in which a data linking system uses artificial intelligence to link data records.

As described above, data corresponding to a particular real estate property (e.g., a parcel, a lot, etc.) may be stored in many different data stores accessible via a network. The data stores may store different information associated with a property, and therefore a user operating a user device may be required to perform additional navigational steps to obtain, view, and/or process all of the data corresponding to a particular property. For example, a computing system that maintains a data store may provide a network-accessible interface by delivering a content page (e.g., a network page, a web page, etc.) to various user devices that allows such user devices to search the data store. Because different data stores may store different information, a user may have to open different browser tabs and/or windows and navigate to multiple content pages to obtain all of the data corresponding to a particular property.

In some cases, a user may not be able to access all of the data corresponding to a particular property even if the user is able to access the different data stores. For example, there can be discrepancies in the data, such as misspelled names, incorrect addresses, conflicting values for the number of bedrooms in the property, etc. Thus, if a user device submits a query for data associated with a property using the correct address for the property, but queries a data store that includes a record with an incorrect address for the property and/or a record that incorrectly identifies a different property as having the address, the query may yield no results or data for the wrong property.

As another example, properties change over time. For example, a lot may be subdivided to create multiple sublots, with each sublot having a different address, parcel number, owner, etc. than the original lot. As another example, a lot may be merged with another lot to create a larger lot, with the larger lot having a different address, parcel number, owner, etc. than the original lots that formed the merged lot. Conventional systems that manage the data stores described above have no mechanism for linking or otherwise indicating a relationship between the original lot(s) and the new lot(s). Thus, an original lot and a new lot may appear to be different properties altogether. While a user device may submit a query for a new lot, data associated with the original lot may be useful as well (e.g., to determine how property values have changed over time, to determine how a certain area has developed over time, etc.). However, a query of the data store for information on the new lot may only yield results for the new lot.

In other cases, a query of the data stores may yield duplicative information that can increase processing times. For example, two data stores may include records for a property providing values for the same property attributes. However, each data store may use different terminology to describe the various property attributes. For example, one data store may refer to the bedroom number attribute as "BDR" and another data store may refer to the bedroom number attribute as "BDRMS." Some conventional systems may be able to consolidate data from different data stores based on common property attributes. However, these conventional systems may not be able to consolidate or deduplicate the data when otherwise common property attributes are referenced using different terminology. Thus, a user device that submits queries to different data stores may receive duplicative data. The user device or other computing system that further processes the received data (e.g., to generate reports, user interfaces, etc.) may not identify the duplicated data given the different terminology. Accordingly, the same processing steps may be performed on the same data values multiple times, thereby increasing the processing time for performing the further processing.

Accordingly, aspects of the present disclosure provide a data linking system that uses artificial intelligence to link data records corresponding to a particular property even if there are inconsistencies in the data records, the physical presence of the property has changed over time (e.g., the property has been subdivided, merged, become inactive, etc.), and/or the data records use different terminology. The data linking system can optionally visualize the data record linkage via interactive user interfaces. By linking data records despite the issues described above, the data linking system reduces the number of navigational steps a user performs to obtain data associated with a property and/or reduces data processing times.

The disclosed data linking system and methods can be used to generate and maintain a comprehensive, authoritative database of substantially all properties (or all properties of a particular type, such as residential properties, commercial properties, industrial properties, etc.) within a jurisdiction (e.g., the United States), with each property assigned a unique identifier. As used herein, a "property" may be any residential, commercial, and/or industrial real estate property owned by a private and/or governmental entity.

While the primary use case for the data linking system described herein is for residential, commercial, and/or industrial real estate property data records, this is not meant to be limiting. For example, the data linking system can use similar techniques to link other types of data records, such as vehicle records, media records (e.g., music records, television show records, movie records, etc.), financial records (e.g., securities records, bank records, etc.), item purchase records, and/or the like.

The foregoing aspects and many of the attendant advantages of this disclosure will become more readily appreciated as the same become better understood by reference to the following detailed description, when taken in conjunction with the accompanying drawings.

Example Data Linking Environment

FIG. 1 is a block diagram of an illustrative operating environment 100 in which a data linking system 120 uses artificial intelligence to link data records. The operating environment 100 further includes one or more third party data stores 130 that may communicate with the data linking system 120 via a network 110 to provide data records. Furthermore, the operating environment 100 includes various user devices 102 that may communicate with the data linking system 120 to obtain and view linked data records.

The data linking system 120 can be a computing system configured to obtain data records from one or more third party data stores 130, identify to which properties the obtained data records belong, link together data records corresponding to the same property, and/or generate user interface data that, when rendered by a user device 102, causes the user device 102 to display a user interface that visually depicts data records corresponding to a particular property. For example, the data linking system 120 can assign a unique identifier to an individual property. Once a data record is identified as corresponding to a particular property, the data linking system 120 can link the data record to the property's unique identifier. In response to a user device 102 query for data associated with a particular property, the data linking system 120 can then identify the unique identifier for the property, and then retrieve and provide the data records linked to the unique identifier.

If a property assigned a unique identifier is subdivided or otherwise split into one or more other properties, the data linking system 120 may assign the new properties new unique identifiers. However, as described in greater detail below, the data linking system 120 may link the unique identifier of the original property with the unique identifiers of the new, "child" properties resulting from the subdivision. Thus, the data linking system 120 can create a hierarchy of unique identifiers. In response to a user device 102 query for data associated with a child property, the data linking system 120 can then use the linked, hierarchy of unique identifiers to retrieve data records for the child property and for the original, parent property.

The data linking system 120 may be a single computing device, or it may include multiple distinct computing devices, such as computer servers, logically or physically grouped together to collectively operate as a server system. The components of the data linking system 120 can each be implemented in application-specific hardware (e.g., a server computing device with one or more ASICs) such that no software is necessary, or as a combination of hardware and software. In addition, the modules and components of the data linking system 120 can be combined on one server computing device or separated individually or into groups on several server computing devices. In some embodiments, the data linking system 120 may include additional or fewer components than illustrated in FIG. 1.

In some embodiments, the features and services provided by the data linking system 120 may be implemented as web services consumable via the communication network 110. For example, the entire data linking system 120 may be implemented as a web service, or individual component(s) of the data linking system 120 (such as the entity matching engine 124, described below) may be implemented as individual web services. In further embodiments, the data linking system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The data linking system 120 may include various modules, components, data stores, and/or the like to provide the data record linking functionality described herein. For example, the data linking system 120 may include a data analyzer 121, a data deduper 122, a minimum viable record (MVR) checker 123, an entity matching engine 124, a record updater 125, an ID generator 126, a user interface generator 127, a pending file data store 128, and a master record data store 129.

The data analyzer 121 can obtain one or more data records from one or more of the third party data stores 130 via the network 110. The third party data stores 130 may be operated by third party entities (e.g., an entity other than the entity that operates the data linking system 120) and/or by the same entity as the entity that operates the data linking system 120, and may store tax roll data, property transaction data (e.g., deed, mortgage, releases, foreclosures, etc.), appraisal data, listing data, and/or any other type of data that describes a property or the events that have occurred in relation to a property (e.g., a sale, a foreclosure, a subdivision, etc.). The data records may include values for zero or more of the following property attributes: tax/legal fields (e.g., assessor parcel number (APN), subdivision, lot number, tract number, block number, etc.), SITUS (e.g., physical street address, geographic coordinates like latitude and longitude, etc.), legal party names (e.g., owner, seller, buyer, etc.), structure information (e.g., number of bedrooms, number of bathrooms, year built, etc.), and/or value (e.g., tax assessment, appraisal value, listing price, etc.). While several property attributes are listed above, this is not meant to be limiting. Any number of types of attributes can be processed by the data linking system 120 in the same manner as described herein link data records.

Once the data records are obtained, the data analyzer 121 can determine whether a data record is a standalone data record or an incremental update data record. For example, the data analyzer 121 may obtain a first data record (e.g., a standalone data record) that has incorrect and/or incomplete data. An entity managing the third party data store 130 from which the first data record is obtained may notice the error, providing the data linking system 120 with an updated data record (e.g., an incremental update data record) that corrects the issue with the first data record. The data analyzer 121 may identify an incremental update data record because the incremental update data record may be provided with an indication of a previous, standalone data record that the incremental update data record updates. A standalone data record can be any data record other than an incremental update data record.

If the data analyzer 121 determines that an obtained data record is a standalone data record, then the data analyzer 121 can pass the data record to the data deduper 122. Otherwise, if the data analyzer 121 determines that an obtained data record is an incremental update data record, then the data analyzer 121 can use the information associated with the incremental update data record to identify the data record that the incremental update data record is updating, retrieve the identified data record from the pending file data store 128 (or the master record data store 129), update the identified data record, and transmit the updated data record to the data deduper 122.

The data deduper 122 can perform mapping and/or deduping functionality. For example, one or more data records obtained from the third party data store(s) 130 may reference the same property. Thus, the data linking system 120 could generate one unique identifier for these data records, instead of multiple unique identifiers for each data record, to reduce processing. Accordingly, the data deduper 122 can analyze data records obtained from the third party data store(s) 130, identifying those data records that correspond to the same property. For example, the data deduper 122 can analyze property attribute values (e.g., SITUS, legal party name, etc.) included in the data records, identifying data records as corresponding to the same property if the data records include the same property attribute values. Of those data records that correspond to the same property, the data deduper 122 may send one of the data records to the MVR checker 123. The data deduper 122 may retain the remaining data records, eventually linking these data records to a unique identifier that is eventually generated in association with the data record sent to the MVR checker 123 or a unique identifier that already exists and corresponds with the property.

Prior to sending a data record to the MVR checker 123, the data deduper 122 may standardize the data record. For example, a data record may be spread out over several tables. The data deduper 122 can identify the property attributes used by the other components of the data linking system 120 (e.g., the property attributes listed above), and consolidate those property attributes of the data record into a single table. The data deduper 122 can also standardize column names (e.g., property attribute names), data types, and/or the formatting of the property attribute values. In some cases, different third party data stores 130 use different types of values for the same property attribute. Thus, the data deduper 122 can convert the values included in data records obtained from certain third party data stores 130 (e.g., appraisal data stores) into a standard format. By standardizing the data record, the data deduper 122 may help improve the accuracy of the matching performed by the entity matching engine 124 discussed below. Improving the accuracy of the matching performed by the entity matching engine 124 can reduce the number of situations in which multiple unique identifiers are assigned to the same property, which thereby reduces any further processing performed by the data linking system 120 or a user device 102.

The MVR checker 123 may determine whether a data record received from the data deduper 122 includes enough information to identify a property corresponding to the data record. For example, the MVR checker 123 may determine that the data record has enough information to identify a property corresponding to the data record if the data record includes at least the name of the property owner and some indication of physical boundaries of the property. A physical boundary of the property can be represented by an APN, a SITUS, a legal description (e.g., as recorded in a recorder's office), or a physical boundary (e.g., a parcel boundary, a building structure footprint, etc.).

In some cases, the name of the property owner may be confidential. Thus, the MVR checker 123 may determine that a data record has enough information to identify a property corresponding to the data record if the data record includes an APN and originates from a third party data store 130 that is a tax roll data store. In addition, the MVR checker 123 may determine that a data record has enough information to identify a property corresponding to the data record if the data record includes only a SITUS and originates from a third party data store 130 that is a listing data store.

If the MVR checker 123 determines that a data record has enough information to identify a property corresponding to the data record, the MVR checker 123 passes the data record to the entity matching engine 124. Otherwise, if the MVR checker 123 determines that a data record does not have enough information to identify a property corresponding to the data record, the MVR checker 123 stores the data record in the pending file data store 128. This data record may then be reanalyzed by the data linking system 120 after, for example, an incremental update data record is received to update the data record with more information.

The entity matching engine 124 may determine whether a data record received from the MVR checker 123 corresponds to a property that has already been assigned a unique identifier or to a property that has not been assigned a unique identifier. It may be important for the entity matching engine 124 to be as accurate as possible in identifying matches between a received data record and a property assigned a unique identifier (e.g., it may be important for the entity matching engine 124 to have a high match rate) because the higher number of data records that are accurately identified as being associated with a unique identifier that has already been generated, the fewer number of processing resources that may be expended by the data linking system 120, a user device 102, and/or an external system (not shown) in the future when further processing data stored in and obtained from the master record data store 129.

The entity matching engine 124 may use a tiered approach to make the determination. For example, in a first tier, the entity matching engine 124 determines whether the data record includes an APN and at least one of a SITUS, a legal field, or an owner name. If the data record includes this information, the entity matching engine 124 queries the master record data store 129 to determine whether any data record stored therein includes matching property attribute values. Each data record stored in the master record data store 129 may correspond to a unique property and include an indication of the unique identifier assigned to the property. Thus, if the query yields a match (e.g., there is a data record stored in the master record data store 129 that includes the same APN and the same SITUS, legal field, or owner name as the data record being processed by the entity matching engine 124), then the entity matching engine 124 can identify the unique identifier assigned to the property to which the data record corresponds. The entity matching engine 124 can then forward the data record and/or unique identifier to the record updater 125.

In some embodiments, the entity matching engine 124 can use fuzzy logic in the first tier to increase the match rate. For example, the entity matching engine 124 can determine that the owner name in a data record matches the owner name in a data record stored in the master record data store 129 if the first N number of characters in the name match (e.g., 1, 2, 3, 4, 5, etc.), if at least the last names match, if the names are otherwise related (e.g., based on an identified family relationship), if the street numbers partially match (e.g., the first two numbers match, the last two numbers match, the first and last numbers match, etc.), if at least the street name matches, if there is a partial match of the legal information (e.g., at least 1 character matches), and/or the like.

However, if the data record does not include the APN and at least one of a SITUS, a legal field, or an owner name and/or if the query yields no match (or no partial match based on fuzzy logic), then the entity matching engine 124 attempts to find a match using a second tier. In the second tier, the entity matching engine 124 determines whether the data record includes a SITUS (e.g., both physical street address and geographic coordinates) and the name of an owner. If the data record includes this information, the entity matching engine 124 determines whether the SITUS passes a standardization test. The entity matching engine 124 may ensure that the SITUS is standardized to increase the overall match rate. For example, the entity matching engine 124 can determine whether the length of a portion of the SITUS (e.g., a zip code) is greater than a threshold number of characters, whether the SITUS can be geomatched to a location in a specific format, and/or the like. The standardization test that the entity matching engine 124 applies to the data record can be different based on which third party data store 130 from which the data record originates. If the data record passes the standardization test, the entity matching engine 124 queries the master record data store 129 to determine whether any data record stored therein includes matching property attribute values. If the query yields a match (e.g., there is a data record stored in the master record data store 129 that includes the same SITUS and owner name as the data record being processed by the entity matching engine 124), then the entity matching engine 124 can identify the unique identifier assigned to the property to which the data record corresponds. The entity matching engine 124 can then forward the data record and/or unique identifier to the record updater 125.

If the data record does not include the SITUS and an owner name, the query yields no match, and/or the SITUS does not pass the standardization test, then the entity matching engine 124 attempts to find a match using a third tier. In the third tier, the entity matching engine 124 determines whether the data record includes a SITUS, structure information (including a year built), and a value (e.g., market value, sale price, listing price, appraised value, etc.). If the data record includes this information, the entity matching engine 124 determines whether the SITUS passes a standardization test. For example, the entity matching engine 124 can determine whether the length of a portion of the SITUS (e.g., a zip code) is greater than a threshold number of characters, whether the SITUS can be geomatched to a location in a specific format, and/or the like. If the data record passes the standardization test, the entity matching engine 124 queries the master record data store 129 to determine whether any data record stored therein includes matching property attribute values. If the query yields a match (e.g., there is a data record stored in the master record data store 129 that includes the same SITUS, same structure information, and similar value (e.g., at least within a threshold percentage of each other) as the data record being processed by the entity matching engine 124), then the entity matching engine 124 can identify the unique identifier assigned to the property to which the data record corresponds. The entity matching engine 124 can then forward the data record and/or unique identifier to the record updater 125.

If the data record does not include the SITUS, the structure information, and the value, the query yields no match, and/or the SITUS does not pass the standardization test, then the entity matching engine 124 attempts to find a match using a fourth tier. In the fourth tier, the entity matching engine 124 determines whether the data record includes a SITUS (e.g. both a physical street address and geographic coordinates). If the data record includes this information, the entity matching engine 124 determines whether the SITUS passes a standardization test. For example, the entity matching engine 124 can determine whether the length of a portion of the SITUS (e.g., a zip code) is greater than a threshold number of characters, whether the SITUS can be geomatched to a location in a specific format, and/or the like. If the data record passes the standardization test, the entity matching engine 124 queries the master record data store 129 to determine whether any data record stored therein includes matching property attribute values. If the query yields a match (e.g., there is a data record stored in the master record data store 129 that includes the same SITUS as the data record being processed by the entity matching engine 124), then the entity matching engine 124 can identify the unique identifier assigned to the property to which the data record corresponds. The entity matching engine 124 can then forward the data record and/or unique identifier to the record updater 125.

If the data record does not include the SITUS, the query yields no match, and/or the SITUS does not pass the standardization test, then the entity matching engine 124 attempts to find a match using a fifth tier. In the fifth tier, the entity matching engine 124 uses artificial intelligence (e.g., machine learning) to attempt to find a match. For example, the entity matching engine 124 can query the master record data store 129 and identify some or all of the data records stored therein that include the same first five digits of the zip code as the data record to be matched and that include the same street number as the data record to be matched. The entity matching engine 124 can then create data structures in which the data record to be matched is individually paired with some or all of the identified data records stored in the master record data store 129. Thus, if 10 data records stored in the master record data store 129 are identified as having the same first five digits of the zip code and the same street number as included in the data record to be matched, the entity matching engine 124 can create 10 pairs.

The entity matching engine 124 can then convert each pair into a feature-based representation. For example, each pair may be converted into a vector, where each element in the vector represents a feature and corresponds to a property attribute. The value of the element may depend on a comparison of the data record obtained from the master record data store 129 and the data record to be matched. For example, for property attribute values that are alphanumeric values and/or for some property attribute values that are numeric values (e.g., street name, street address, city, state, owner name, year built, tax assessment value, listing price, subdivision name, lot number, etc.), the entity matching engine 124 may set the corresponding element value to be −1 (or another integer) if the value of the property attribute in the master record data store 129 data record and/or in the data record to be matched value is empty (e.g., no value is provided for a street name in one or both data records) or to a value representing a distance between the values in the master record data store 129 data record and in the data record to be matched (e.g., the element value may be a length-normalized Levenshtein distance between the value in the master record data store 129 data record and the value in the data record to be matched). Alternatively, some or all property attributes may be associated with an attribute_exist flag (e.g., street_name_exist_flag, street_address_exist_flag, etc.) that can be set to −1 (or another integer) instead of the property attribute value itself if the property attribute value in the data record is otherwise empty. The entity matching engine 124 can also determine a distance between a seller's name included in the data record to be matched and an owner's name included in the master record data store 129 data record.

For other property attribute values that are numeric values (e.g., lot size, number of rooms, number of bedrooms, number of bathrooms, number of fireplaces, size of living area, year built, number of stores, tax assessed value, listing price, etc.), the entity matching engine 124 may set the corresponding element value to be −1 (or another integer) if the value of the property attribute in the master record data store 129 data record and/or in the data record to be matched is null, or to a value representing an absolute value of the difference between the values in the master record data store 129 data record and in the data record to be matched. For latitude and longitude values, the entity matching engine 124 can set the corresponding element value to the numeric distance between the latitude and longitude of the master record data store 129 data record and the data record to be matched.

For any property attributes that have binary values (e.g., whether a pool is present), the entity matching engine 124 can set the corresponding element value to the XOR of the values in the master record data store 129 data record and in the data record to be matched (e.g., the element value is 1 if both data records indicate that a pool is present or that a pool is not present, and is 0 if the data records give opposite indications).

The entity matching engine 124 can then apply each feature-based representation as an input to a machine learning model. In response, the machine learning model may output a probability of a match (e.g., a probability that a master record data store 129 data record and a data record to be matched, which are paired and represented by the feature-based representation, correspond to the same property). The entity matching engine 124 may identify a match if the probability is above a threshold value (e.g., 50%). If the entity matching engine 124 identifies a match, the entity matching engine 124 can identify the unique identifier associated with the master record data store 129 data record that resulted in a match, and forward the data record to be matched and/or the unique identifier to the record updater 125.

Prior to using the machine learning model to identify potential matches, the entity matching engine 124 may have trained the machine learning model. For example, the entity matching engine 124 may obtain a large, synthetic dataset that includes data records that have been matched using any of the first four tiers. The entity matching engine 124 may then pair these data records and generate feature-based representations using the techniques described above. Because the data records in the dataset have already been matched, each feature-based representation is also labeled with an indication that the data records are a match or are not a match. The entity matching engine 124 uses a portion of the labeled feature-based representations to train the machine learning model, and another portion of the labeled feature-based representations to evaluate the accuracy of the machine learning model (e.g., by feeding the feature-based representations as inputs to the machine learning model and determining whether the resulting probability is above a threshold value when a match should be identified and is below a threshold value when a match should not be identified). Alternatively or in addition, the entity matching engine 124 can take in user feedback to train or update the machine learning model (e.g., the user feedback can include an indication of when a match was properly identified, when a match was improperly identified, when no match was properly identified, and/or when no match was improperly identified).

One issue, however, with using machine learning to increase the match rate of the entity matching engine 124 is that the machine learning model may produce false positives (e.g., data records that are matched when such data records should not be matched). This may occur when two distinct properties share the same characteristics, and the specific data records involved in the match are missing those few property attributes that would allow the machine learning model to identify a mismatch rather than a match. As an illustrative example, homes located within the same subdivision may have identical floor plans, and therefore many of the property attributes values (e.g., number of bedrooms, number of bathrooms, lot size, etc.) may be the same. If the street address, for example, is missing from the data records, the machine learning model may generate a false positive.

Thus, the entity matching engine 124, after receiving an output from the machine learning model, may implement additional matching operations in an attempt to reduce the number of false positives generated by the machine learning model, thereby improving the functionality of the data linking system 120 itself. For example, the entity matching engine 124 may determine that a match identified by the machine learning model is indeed a match if a data record to be matched matches to a unique property in the master record data store 129. In other words, the entity matching engine 124 may determine that a match identified by the machine learning model is not a match if the machine learning model indicates that the data record to be matched matches to a first data record in the master record data store 129 and any number of other data records in the master record data store 129 (e.g., the machine learning model produced a high probability score, such as over 50%, for more than one feature-based representation). If the entity matching engine 124 identifies a false positive, then the entity matching engine 124 does not send the data record and/or unique identifier to the record updater 125 even though the machine learning model identifies a match. These additional matching operations allows the entity matching engine 124 to overcome the myopic "one pair at a time" approach taken by the machine learning model, allowing the entity matching engine 124 to consider all related pairs as a group in making a final determination as to whether a match is present.

In some embodiments, the entity matching engine 124 can also receive user feedback to reduce the number of false positives generated by the machine learning model. For example, feedback provided by users may indicate which matches were accurate and which were inaccurate. The machine learning model can then be tuned using this feedback to reduce the false positive rate going forward.

The entity matching engine 124 can assign a confidence score to a resulting match based on the tier that results in a match. For example, a match resulting in the first tier may be assigned a highest confidence score, whereas a match resulting in the fifth tier may be assigned a lowest confidence score. The confidence score can be associated with a data record (or the property attribute values included therein) and stored in the master record data store 129. Thus, a user device 102 can, for example, request data records from the data linking system 120 that are associated with confidence scores higher than a threshold value, at a threshold value, less than a threshold value, etc. If none of the tiers implemented by the entity matching engine 124 yields a match, then the entity matching engine 124 forwards the data record to the ID generator 126.

For example, the confidence score associated with a tier may be dependent on a false positive rate and/or a false negative rate associated with the tier. As an illustrative example, the first tier may have a 0% false positive rate and a 0% false negative rate and may be associated with a confidence score of 10. The fifth tier may have a 5% false positive rate and a 0.1% false negative rate and may be associated with a confidence score of 8. When a user device is provided with an indication of a possible match, the provided information may be annotated, modified, or otherwise labeled to indicate the corresponding confidence score of the match (e.g., the confidence score associated with the tier that produced the match).

Furthermore, the confidence score associated with a tier may change depending one or more factors. For example, such factors can include a data source (e.g., tax roll, listing data, etc.), location of the property (e.g., whether the location is a slow developing area or a fast developing area), land use code of the property (e.g., single-family house, multi-family house, etc.), and/or the like. Thus, even if two different matches resulted from the same tier, the confidence scores associated with the matches may be the same or different. In some embodiments, a machine learning model can be trained (e.g., by the entity matching engine 124) to estimate the accuracy of each tier given the factors described above (e.g., by using a training set of data that includes matches produced by a tier, an indication of the factors corresponding to each match, and labels identifying the accuracy of these matches).

In further embodiments, as discussed below with respect to FIG. 7, the entity matching engine 124 can perform one or more pre-processing operations prior to implementing the tiered approach to identifying a match. The pre-processing operations may include further cleansing and/or standardizing of the data record, which can further increase the entity matching engine 124 match rate (and thereby reduce the amount of further processing performed by the data linking system 120, a user device 102, and/or an external system, not shown).

The record updater 125 can determine whether the data record obtained from the entity matching engine 124 includes data newer than the data stored in the master record data store 129 data record. For example, the master record data store 129 may include several tables, including a master record history table, a master record table, a master cross-reference table, and/or a master event history table. Each entry in the master record history table may be associated with a unique identifier and indicate the property record history of the property corresponding to the unique identifier (e.g., where the property record history includes information identify the date a deed was recorded, the date a refinance occurred, the date a remodel was completed, etc.). Thus, the record updater 125 can query the master record history table using the unique identifier provided by the entity matching engine 124, and identify the most-recent date indicated in the master record history table entry for the unique identifier. The record updater 125 can then identify a date included in the data record obtained from the entity matching engine 124, and compare the most-recent date with the data record date to determine which is most-recent. If the date included in the data record is newer, then the record updater 125 can update the master record table as described below. Otherwise, if the date included in the data record is not newer, then the record updater 125 can update the master record history table to include the date of the data record obtained from the data linking system 120 and an indication of a type of the data record (e.g., a listing, an appraisal, a transaction, etc.).

As for the other tables in the master record data store 129, each entry in the master record table may be associated with a unique identifier and include the most-recent property attribute values of the property corresponding to the unique identifier. The entries in the master record table are also referred to above as master record data store 129 data records. Each entry in the master cross-reference table may indicate a linkage between a unique identifier and each data record obtained from a third party data store 130 determined by the data linking system 120 to correspond to the unique identifier. Each entry in the master event history table may indicate events corresponding to a unique identifier, such as a date that a property corresponding to the unique identifier was created, a date that a property corresponding to the unique identifier was updated, a date that a property corresponding to the unique identifier was split into multiple sub-properties or was merged to create a larger property, a date that a property corresponding to the unique identifier was deactivated (e.g., the property was damaged or destroyed), etc. While the master record data store 129 is described as having four tables, this is not meant to be limiting. The data included in the four tables can be combined into three or fewer tables, or further split into five or more tables.

Thus, if the record updater 125 determines that the data record obtained from the data linking system 120 is newer, the record updater 125 can query the master record table for an entry associated with the unique identifier obtained from the entity matching engine 124. The record updater 125 can then determine whether any property attribute values included in the data record are different from the property attribute values in the master record table entry and, if so, update the master record table entry to include the property attribute values included in the data record. The operations performed by the data linking system 120 to consolidate information from many different data records corresponding to a property into a single entry or data record in the master record table can (1) reduce future processing operations performed by the data linking system 120 because the data linking system 120 now does not have to retrieve and provide each of the data records in response to a query submitted by a user device 102 for property information; (2) reduce future processing operations performed by a user device 102 and/or an external system (not shown) because, in response to a query for property information, the user device 102 and/or external system receives a curated set of property attribute values rather than multiple sets of property attribute values spread out over multiple data records, where the property attribute values could be outdated or otherwise incorrect; and (3) reduce data linking system 120 memory usage because the master record data store 129 may not have to store each data record obtained from the third party data store 130—rather, the master record data store 129 can merely store the most-recent or up-to-date property attribute values of a given property.

Once the master record history table and/or the master record table are updated, the record updater 125 can also update the master cross-reference table to link, in the table, the data record obtained from the entity matching engine 124 with the unique identifier obtained from the entity matching engine 124. For example, the data records stored in the various third party data stores 130 may have a reference identifier, and the master cross-reference table can link the unique identifier to the reference identifiers. Thus, if a user device 102 submits a query to the data linking system 120 for some or all of the data records corresponding to a particular property, the data linking system 120 can query the master cross-reference table and quickly identify the relevant data records, providing the reference identifiers to the user device 102. The user device 102 can then request some or all of the data records from the appropriate third party data stores 130.

In some embodiments, the data record obtained from the entity matching engine 124 may indicate an event that occurred in relation to the property (e.g., creation, update, split, merge, deactivation, etc.). The record updater 125 can analyze the data record obtained from the entity matching engine 124 to identify such a situation, and update the master event history table accordingly. If the record updater 125 identifies that a property has been split or merged, the record updater 125 can send data (e.g., property attribute values) associated with the property or properties formed by the split or merge to the ID generator 126. Once the ID generator 126 generates a new unique identifier for a split or merged property, the ID generator 126 can update the master event history table to link the unique identifier of the property that was split or merged with the unique identifier (s) of the resulting property or properties. As described below, this linking of unique identifiers allows the user interface generator 127 to then generate an interactive user interfaces that allow a user to view how a property has changed over time.

The ID generator 126 can generate a new unique identifier for a property associated with a data record obtained from the entity matching engine 124 (since the entity matching engine 124 provides the data record to the ID generator 126 when a match is not found). For example, the ID generator 126 can use a random number generator to assign a unique identifier to the data record (where the ID generator 126 performs a check to ensure that the generated random number is unique and has not been assigned to other data records or properties). Alternatively, the ID generator 126 can generate unique identifiers in sequence, assigning the next unique identifier in the sequence to the data record. The unique identifier can be any number of digits, such as 10, 20, 30, etc. Once created, the ID generator 126 can create a new entry in the master record history table, the master record table, the master cross-reference table, and/or the master event history table for the generated unique identifier, populating one or more of the tables with property attribute values included in the data record.

In some embodiments, the ID generator 126 can generate an identifiability score associated with a unique identifier that estimates the confidence of creating a new unique identifier based on a data record from any data source. Data completeness, data accuracy, and/or data source reliability may be factors that affect the identifiability score. The identifiability score can be provided to a user device 102 in conjunction with other information related to the corresponding unique identifier (e.g., property data), thereby allowing a user to get a more accurate estimate on the population and growth of the real estate market for a portfolio or region of interest. As an illustrative example, the identifiability score may indicate that in a first region, there is a confidence of 99% that there has been a 2% increase in the number of single family houses in the first region, and there is a confidence of 70% that there has been a 4% increase in the number of single family houses in the first region.

As an example, an identifiability score associated with a unique identifier may be high if a new property is recognized from tax roll data, regardless of whether the SITUS is complete. An identifiability score associated with a unique identifier may also be high if a new property is recognized from listing, appraisal, or transaction data, is not found in the tax roll data, but the SITUS has been verified by a third party data service (e.g., a USPS address database). An identifiability score associated with a unique identifier may be medium if a new property is recognized from listing data and has a SITUS verified by appraisal or transaction data, but is not found in the tax roll data and the SITUS is not verified by the third party data service. An identifiability score associated with a unique identifier may also be medium if a new property is recognized from appraisal data and a legal subdivision and/or lot number is verified by transaction data, but is not in the tax roll data and the SITUS is not verified by the third party data service. An identifiability score associated with a unique identifier may be low if a new property is recognized from the transaction, listing, or appraisal data, but is not found in the tax roll data and the SITUS is not verified by the third party data service.

In some embodiments, the identifiability score associated with a unique identifier is not static. For example, the identifiability score associated with a unique identifier may change as property records associated with the unique identifier are updated. As an illustrative example, an identifiability score for a unique identifier may initially be low because the SITUS could not be verified. After an update in which the SITUS is corrected, updated to be more complete, etc. and can now be verified, the identifiability score may be updated (e.g., to a higher value) to reflect the fact that the SITUS can be verified. As another illustrative example, the third party data service may be out-of-date (e.g., for a newly built neighborhood) and thus the identifiability score associated with a unique identifier may be low because the SITUS could not be verified. Once the third party data service is updated, the same SITUS can now be verified, and thus the identifiability score may be updated (e.g., to a higher value).

The user interface generator 127 can generate user interface data that, when rendered by a user device 102, causes the user device to display a user interface in which various property attribute values of a property are displayed, optionally including interactive features that allow a user to view the history of a property over time. The user interfaces are described in greater detail below with respect to FIGS. 5A through 6.

The pending file data store 128 stores data records that are incomplete or otherwise do not qualify as including a minimum amount of information to potentially identify a match to a unique identifier (e.g., to a property). While the pending file data store 128 is depicted as being located internal to the data linking system 120, this is not meant to be limiting. For example, not shown, the pending file data store 128 can be located external to the data linking system 120.

The master record data store 129 stores various tables corresponding to a master record of property attribute values, as described above. While the master record data store 129 is depicted as being located internal to the data linking system 120, this is not meant to be limiting. For example, not shown, the master record data store 129 can be located external to the data linking system 120.

The speed at which the data linking system 120 (and/or the entity matching engine 124) perform the operations described herein may be faster than conventional systems given the architecture of the data linking system 120 (and/or the entity matching engine 124). As an illustrative example, the data linking system 120 (and/or the entity matching engine 124) can process and link over 1 billion data records in less than 4 hours. Conventional systems, on the other hand, may take multiple days to process and link the same volume of data records. The data linking system 120 (and/or the entity matching engine 124) can achieve such results using a distributed parallel processing approach.

For example, the data linking system 120 (and/or the entity matching engine 124) may include a plurality of processors. The data linking system 120 (and/or the entity matching engine 124) can take advantage of these processors by dividing data to process into multiple different buckets. As an example, the data linking system 120 (and/or the entity matching engine 124) can group the data to process into 3000 or more different buckets (e.g., by federal information processing standards (FIPS) code, zip code, etc.). The data linking system 120 (and/or the entity matching engine 124) can assign each bucket to a particular processor. By grouping data into different buckets, the data linking system 120 (and/or the entity matching engine 124) can balance the load in different processors, allowing the processors to run in parallel and process the data in the respective assigned bucket. In particular, each processor can perform the entire workflow described herein (e.g., the operations performed by components of the data linking system 120 (and/or the entity matching engine 124)) using the data grouped into the bucket assigned to the respective processor.

As described herein, each identifier is unique. The challenge with parallel processing, however, is to avoid having the same unique identifier be assigned to different properties since the identifier could be generated independently in different processors. To address this challenge, each processor generates and assigns a processing index to each data record in a bucket. Data records grouped into a bucket may be organized into rows (e.g., where one row corresponds to one data record), and the processing index may be dependent on the bucket number in which the data record is grouped and the row number of the data record.

As an illustrative example, data record A may be grouped into bucket #10001 at row number 100. The processor assigned to bucket #10001 can append the bucket number with the row number (in any order) to generate and assign a processing index to data record A (e.g., 10010001 or 10001100 in this case). Similarly, data record B may be grouped into bucket #10002 at row number 100. The processor assigned to bucket #10002 can append the bucket number with the row number (in any order) to generate and assign a processing index to data record B (e.g., 10010002 or 10002100 in this case). Each processor may maintain or persist the maximum row number such that when a processor begins processing a new set of data, the first row number for the new data grouped into the bucket assigned to the processor may be a value higher (e.g., 1 higher) than the maximum row number of the previous set of data records that were processed by the processor.

After some or all of the processors have generated and assigned processing indices to the data records in the different buckets, the processors can select unique identifiers to associate with the processing indices. For example, the data linking system 120 (and/or the entity matching engine 124) can generate a common pool of unique identifiers. The number of unique identifiers generated may be the same or higher than the number of data records being processed by the processors (e.g., 10 times higher, 100 times higher, etc.). Each processor can then randomly select a unique identifier from the common pool and append or otherwise combine the selected unique identifier with the processing index of a data record to form a unique identifier associated with the data record. Once a processor selects a unique identifier from the common pool, no other processor may be able to select that unique identifier. When the processors begin processing a new set of data records, the processors can use the same common pool of unique identifiers, selecting unique identifiers that remain in the common pool. This process can be repeated any number of times for any number of new data records to process. Thus, the data linking system 120 (and/or the entity matching engine 124) can use these techniques to ensure that the processors do not accidentally produce duplicate identifiers for different data records and/or properties.

Example Block Diagrams for Linking a Data Record to a Unique Identifier

Figure 2A:
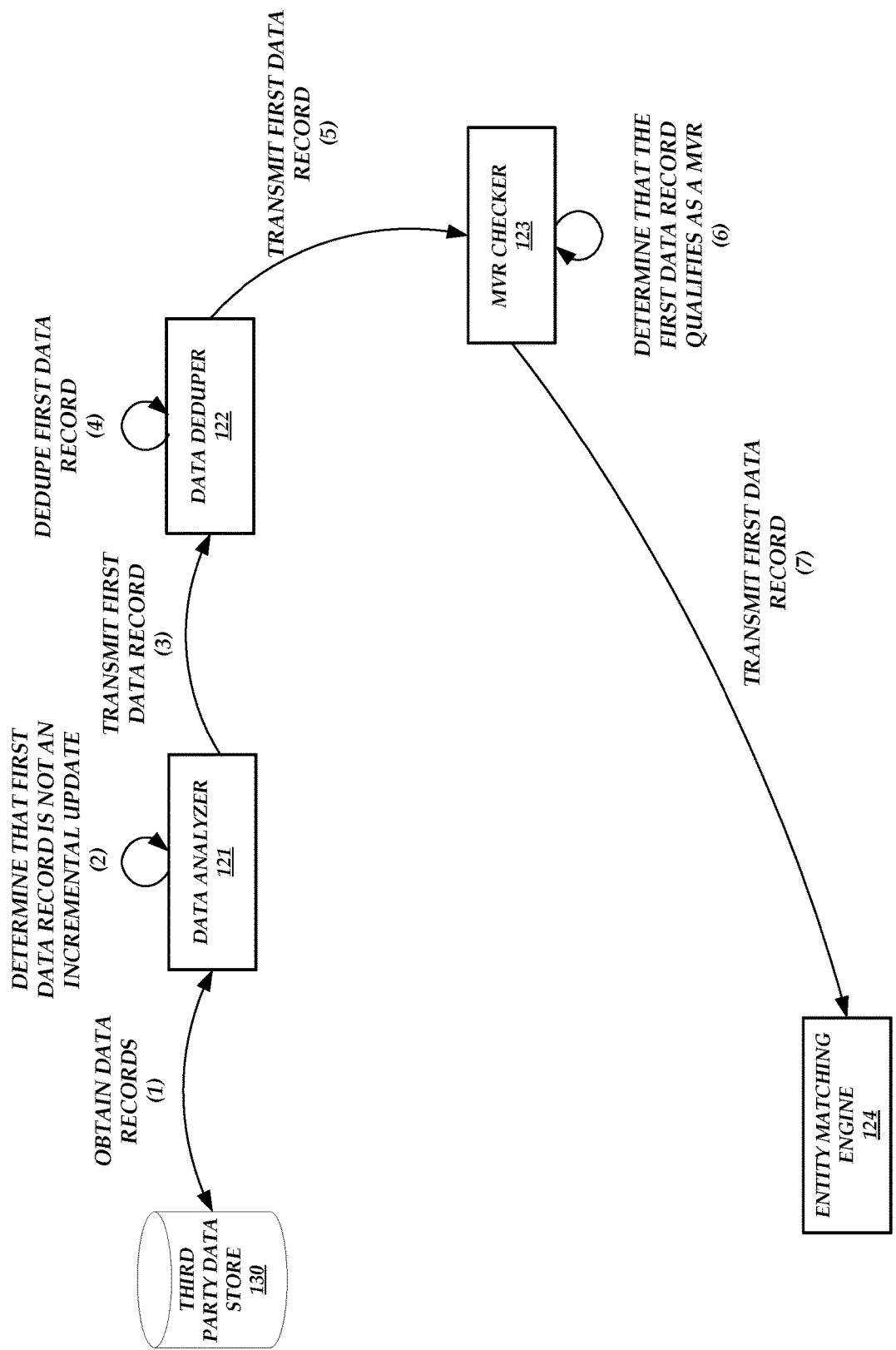
FIGS. 2A-2C are flow diagrams illustrating the operations performed by the components of the operating environment of FIG. 1 to process a data record to begin the linking or matching process.
Figure 2B:
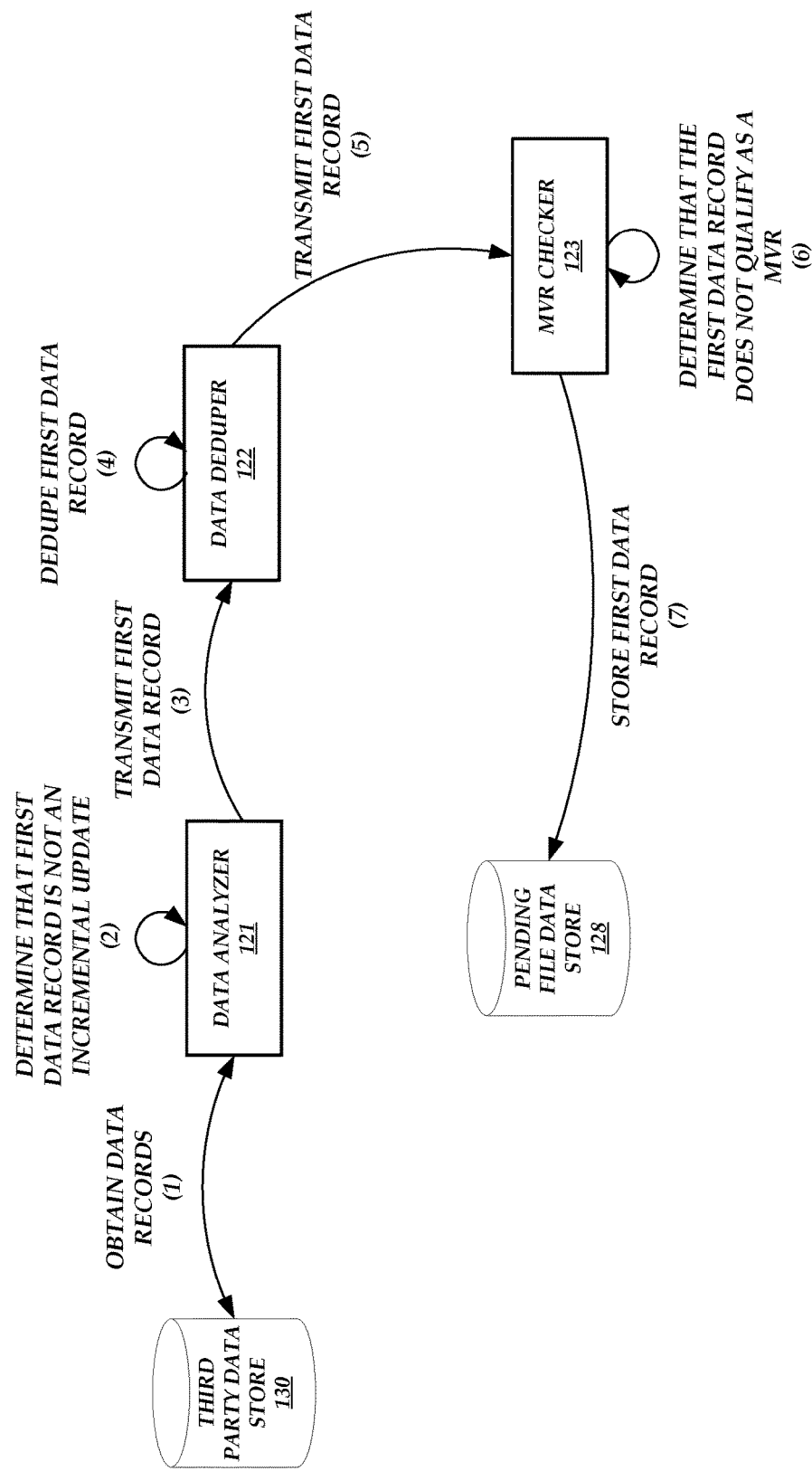
Figure 2C:
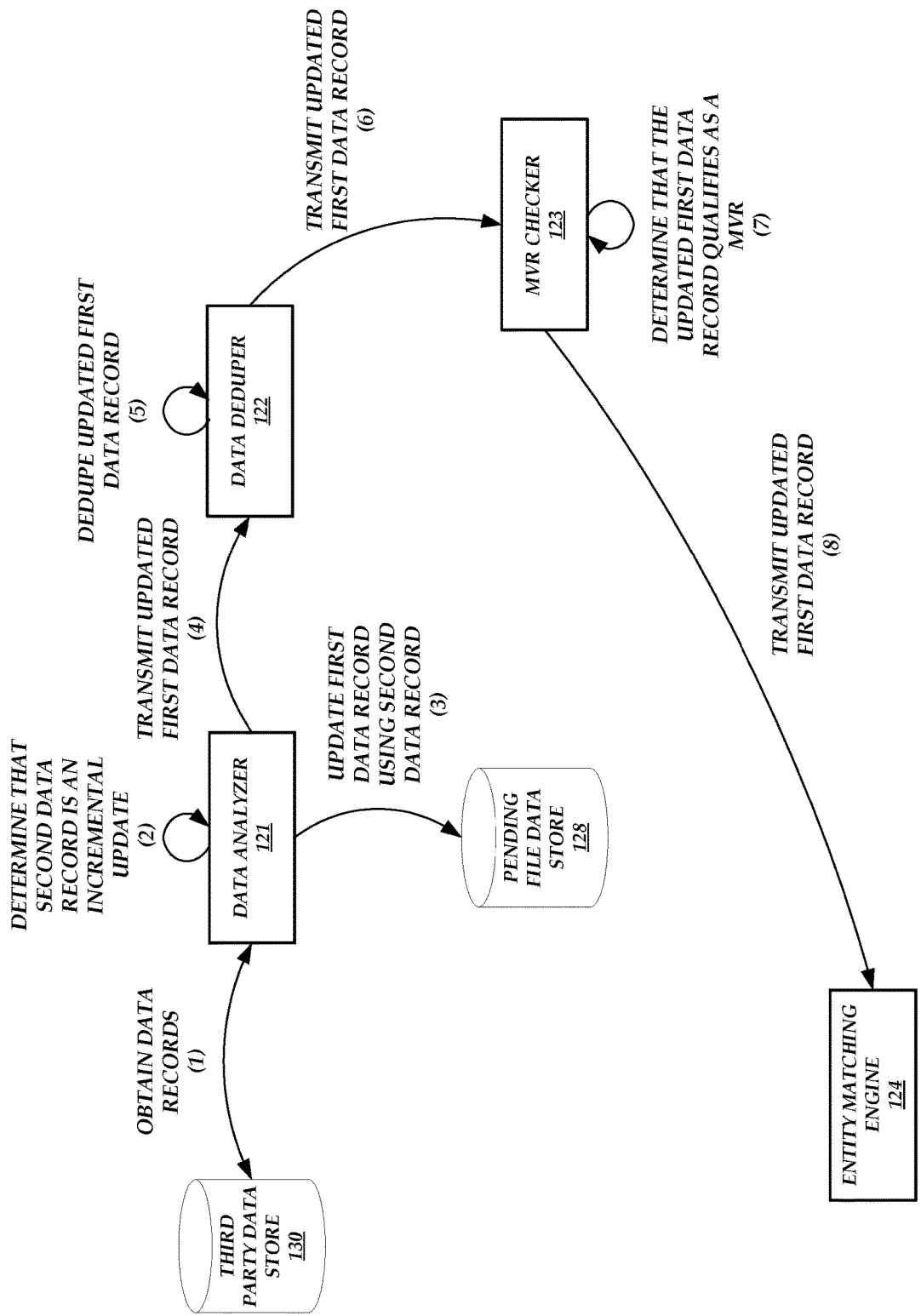

FIGS. 2A-2C are flow diagrams illustrating the operations performed by the components of the operating environment 100 of FIG. 1 to process a data record to begin the linking or matching process. As illustrated in FIG. 2A, the data analyzer 121 obtains data records from the third party data store 130 at (1). The data analyzer 121 can obtain the data records using a real-time load (e.g., one data record is obtained at a time, but with a very fast speed, such as 1 million data records per second) and/or a batch load process (e.g., multiple data records are obtained at the same time). The data analyzer 121 can obtain the data records in one of many different data formats, such as AVRO, PARQUET, TXT, ORC, etc. The data records may be included in messages obtained by the data analyzer 121, and such messages can be in one of many different message formats, such as JSON, XML, etc. The data analyzer 121 may then determine that a first data record in the data records that are obtained is not an incremental update data record at (2). Rather, the data analyzer 121 determines that the first data record is a standalone data record. The data analyzer 121 transmits the first data record to the data deduper 122 at (3).

The data deduper 122 dedupes the first data record at (4). For example, the data deduper 122 may determine that several data records in the ones obtained from the third party data store 130, including the first data record, correspond to the same property. Thus, the data deduper 122 may discard the other data records corresponding to the property, retaining the first data record. By performing the dedupe operation, the data deduper 122 reduces the amount of processing eventually performed by the data linking system 120 because repeated processing steps that yield that same result (e.g., a determination that these data records correspond to the same unique identifier) can be avoided. The data deduper 122 can then transmit the first data record to the MVR checker 123 at (5).

The MVR checker 123 can analyze the property attribute values included in the first data record to determine whether there is a minimum amount of information available to potentially identify a matching property (e.g., a matching unique identifier). Here, the MVR checker 123 determines that the first data record qualifies as a minimum viable record at (6). The MVR checker 123 then transmits the first data record to the entity matching engine 124 at (7).

As illustrated in FIG. 2B, the MVR checker 123 analyzes the property attribute values included in the first data record and determines that the first data record does not qualify as a minimum viable record at (6). In response, the MVR checker 123 stores the first data record in the pending file data store 128 at (7) rather than transmitting the first data record to the entity matching engine 124. The first data record may then be updated at a later time, allowing the data record to then potentially be matched by the entity matching engine 124, as described with respect to FIG. 2C.

As illustrated in FIG. 2C, the data analyzer 121 obtains data records from the third party data store 130 at (1) and determines that a second data record that is obtained is an incremental update data record at (2). In particular, the data analyzer 121 determines that the second data record is an update of the first data record (e.g., based on metadata or other data associated with the second data record). Thus, the data analyzer 121 updates the first data record stored in the pending file data store 128 using the second data record at (3). The data analyzer 121 then transmits the updated first data record to the data deduper 122 at (4).

The data deduper 122 dedupes the updated first data record at (5). For example, the data deduper 122 may determine that several data records in the ones obtained from the third party data store 130 and the updated first data record correspond to the same property. Thus, the data deduper 122 may discard the other data records corresponding to the property, retaining the updated first data record. By performing the dedupe operation, the data deduper 122 reduces the amount of processing eventually performed by the data linking system 120 because repeated processing steps that yield that same result (e.g., a determination that these data records correspond to the same unique identifier) can be avoided. The data deduper 122 can then transmit the updated first data record to the MVR checker 123 at (6).

The MVR checker 123 can analyze the property attribute values included in the updated first data record to determine whether there is a minimum amount of information available to potentially identify a matching property (e.g., a matching unique identifier). Here, the MVR checker 123 determines that the updated first data record qualifies as a minimum viable record at (7). The MVR checker 123 then transmits the updated first data record to the entity matching engine 124 at (8).

Figure 3A:
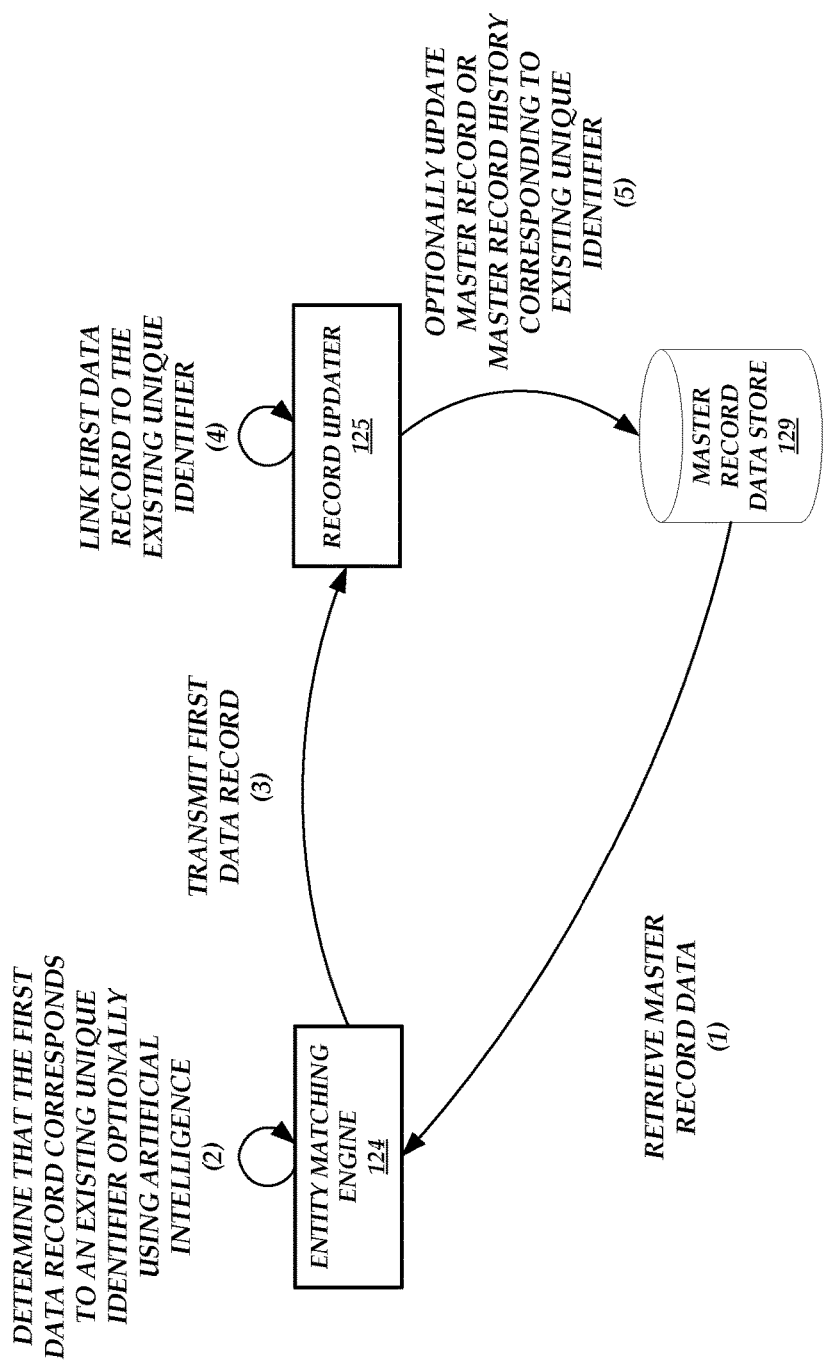
FIGS. 3A-3B are flow diagrams illustrating the operations performed by the components of the operating environment of FIG. 1 to link or match data records to unique identifiers (e.g., to link or match data records to a representation of a specific property).
Figure 3B:
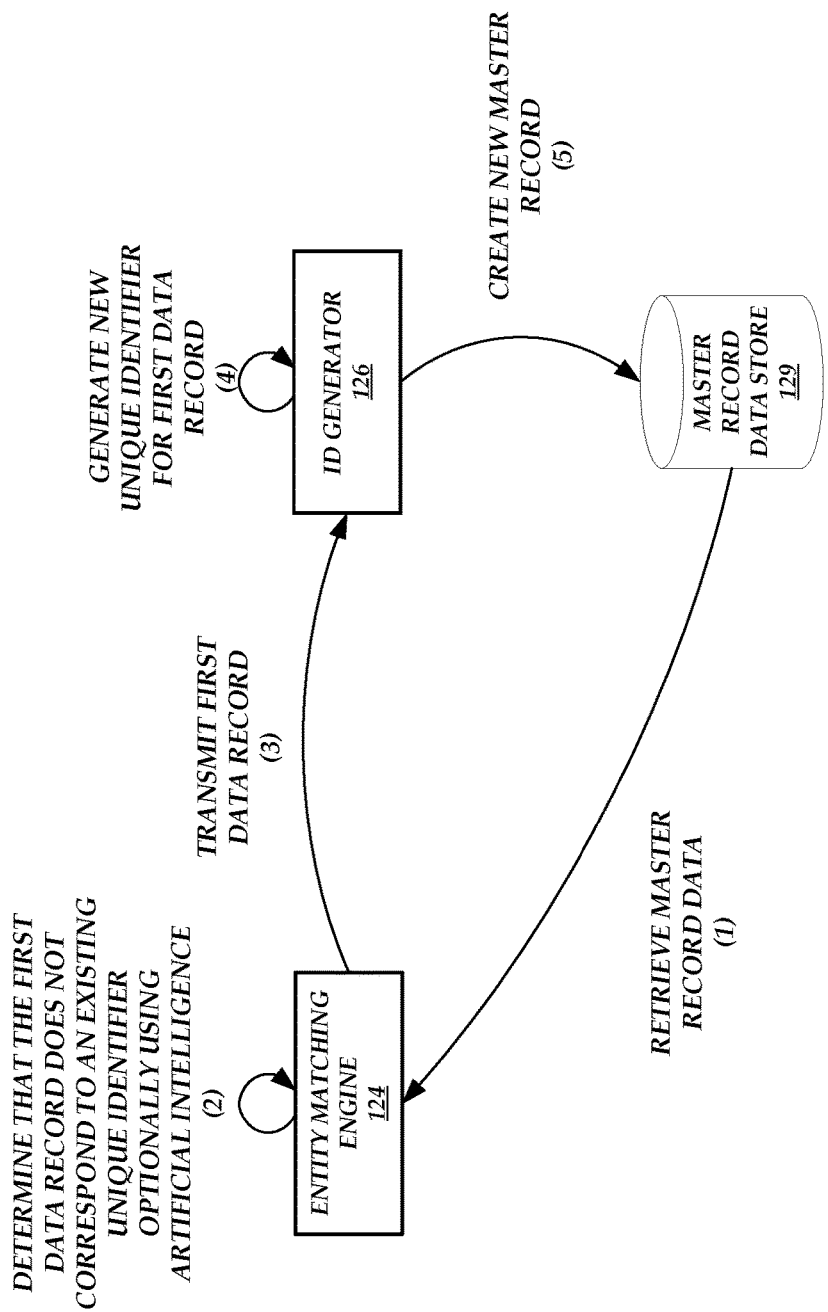

FIGS. 3A-3B are flow diagrams illustrating the operations performed by the components of the operating environment 100 of FIG. 1 to link or match data records to unique identifiers (e.g., to link or match data records to a representation of a specific property). As illustrated in FIG. 3A, the entity matching engine 124 retrieves master record data from the master record data store 129 at (1), which can include data from some or all of the tables stored in the master record data store 129.

The entity matching engine 124 determines that a first data record corresponds to an existing unique identifier optionally using artificial intelligence at (2). For example, the entity matching engine 124 uses a tiered approach to determine whether some or all of the property attribute values in the first data record match property attribute values stored in the master record data store 129 (e.g., in the master record table) in association with a particular unique identifier. The entity matching engine 124 may use a machine learning model to identify a potential match if, for example, no match is identified using tiers higher in the hierarchy (e.g., the first through fourth tiers). Because a match is identified, the entity matching engine 124 transmits the first data record to the record updater 125 at (3).

The record updater 125 can link the first data record to the existing unique identifier at (4). For example, the record updater 125 can update the master cross-reference table to link the unique identifier with the first data record itself or a reference identifier of the first data record. Optionally, the record updater 125 can update the master record history table and/or the master record table corresponding to the existing unique identifier at (5). For example, the record updater 125 may update the master record history table if the first data record includes old information (e.g., potentially outdated information, where the master record table includes property attribute values sourced from newer data records), and the record updater 125 may update the master record table if the first data record includes new information that differs from the property attribute values included in the entry in the master record table corresponding to the existing unique identifier.

As illustrated in FIG. 3B, the entity matching engine 124 retrieves master record data from the master record data store 129 at (1), which can include data from some or all of the tables stored in the master record data store 129.

The entity matching engine 124 determines that a first data record does not correspond to an existing unique identifier optionally using artificial intelligence at (2). For example, the entity matching engine 124 uses a tiered approach to determine whether some or all of the property attribute values in the first data record match property attribute values stored in the master record data store 129 (e.g., in the master record table) in association with a particular unique identifier. The entity matching engine 124 may use a machine learning model to identify a potential match if, for example, no match is identified using tiers higher in the hierarchy (e.g., the first through fourth tiers). Because a match is not identified, the entity matching engine 124 transmits the first data record to the ID generator 126 at (3).

The ID generator 126 can generate a new unique identifier for the first data record at (4). For example, the ID generator 126 can assign the property corresponding to the first data record a random number. The ID generator 126 can then create a new master record in the master record data store 129 at (5). For example, the ID generator 126 can create new entries in some or all of the tables of the master record data store 129 that are each associated with the newly generated unique identifier and that are populated with some or all of the information included in the first data record.

Example Block Diagram for Generating a User Interface with Property Data

Figure 4:
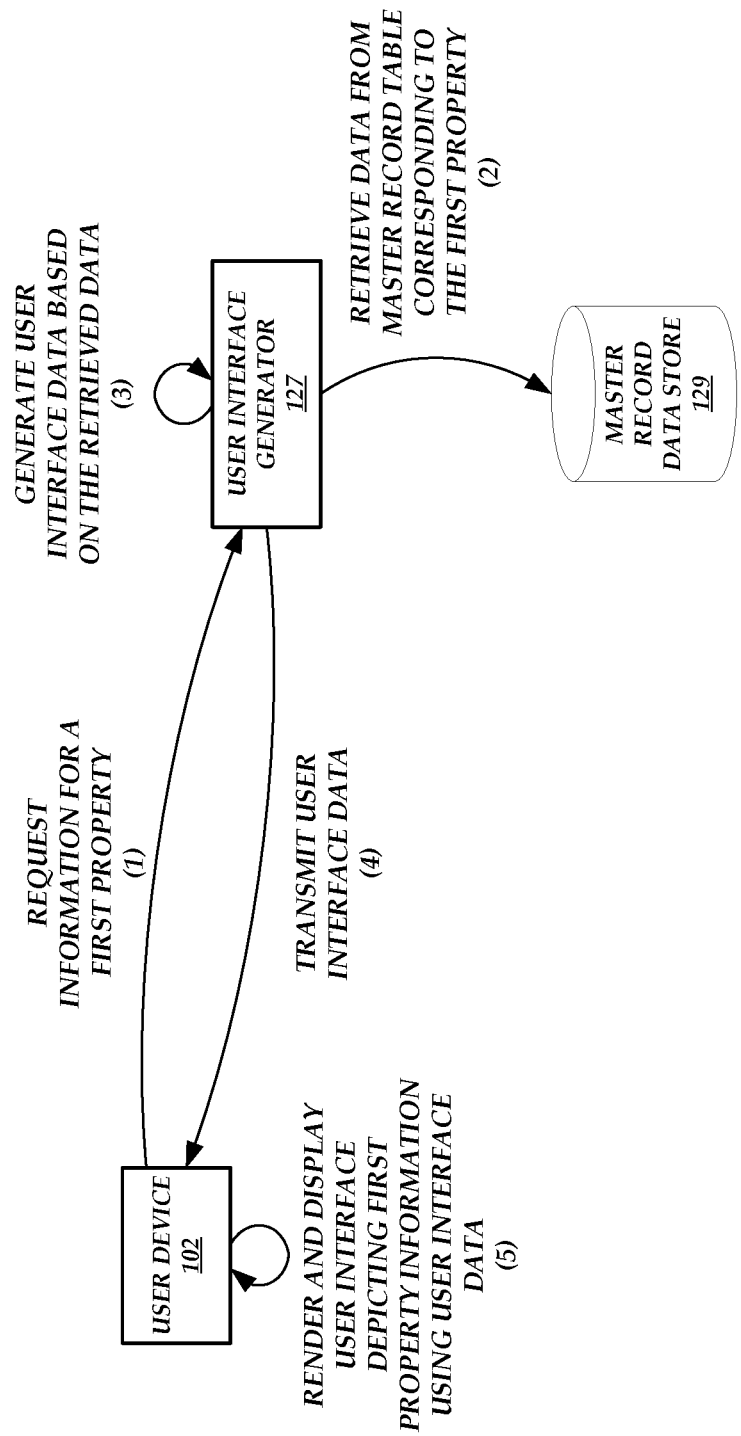
FIG. 4 is a flow diagram illustrating the operations performed by the components of the operating environment of FIG. 1 to provide property data to a user device for display in an interactive user interface.

FIG. 4 is a flow diagram illustrating the operations performed by the components of the operating environment 100 of FIG. 1 to provide property data to a user device 102 for display in an interactive user interface. As illustrated in FIG. 4, the user device 102 requests information for a first property at (1). The user interface generator 127 can receive the request, and retrieve data from the master record table corresponding to the first property at (2). For example, the request from the user device 102 may include some property attribute values. The user interface generator 127 can query the master record data store 129 (e.g., the master record table) for an entry that matches some or all of these property attribute values. The master record data store 129 can then return some or all of the property attribute values for the entry that includes the matching property attribute values. The user interface generator 127 can also identify the unique identifier corresponding to the entry, and retrieve additional data from other entries in the other tables stored in the master record data store 129 that are associated with the identified unique identifier The user interface generator 127 can generate user interface data based on the retrieved data at (3). The user interface generator 127 can then transmit the user interface data to the user device 102 at (4).

The user device 102 may then render and display a user interface depicting the information associated with the first property using the user interface data at (5). Example user interfaces are described below with respect to FIGS. 5A through 6.

Example User Interfaces

Figure 5A:
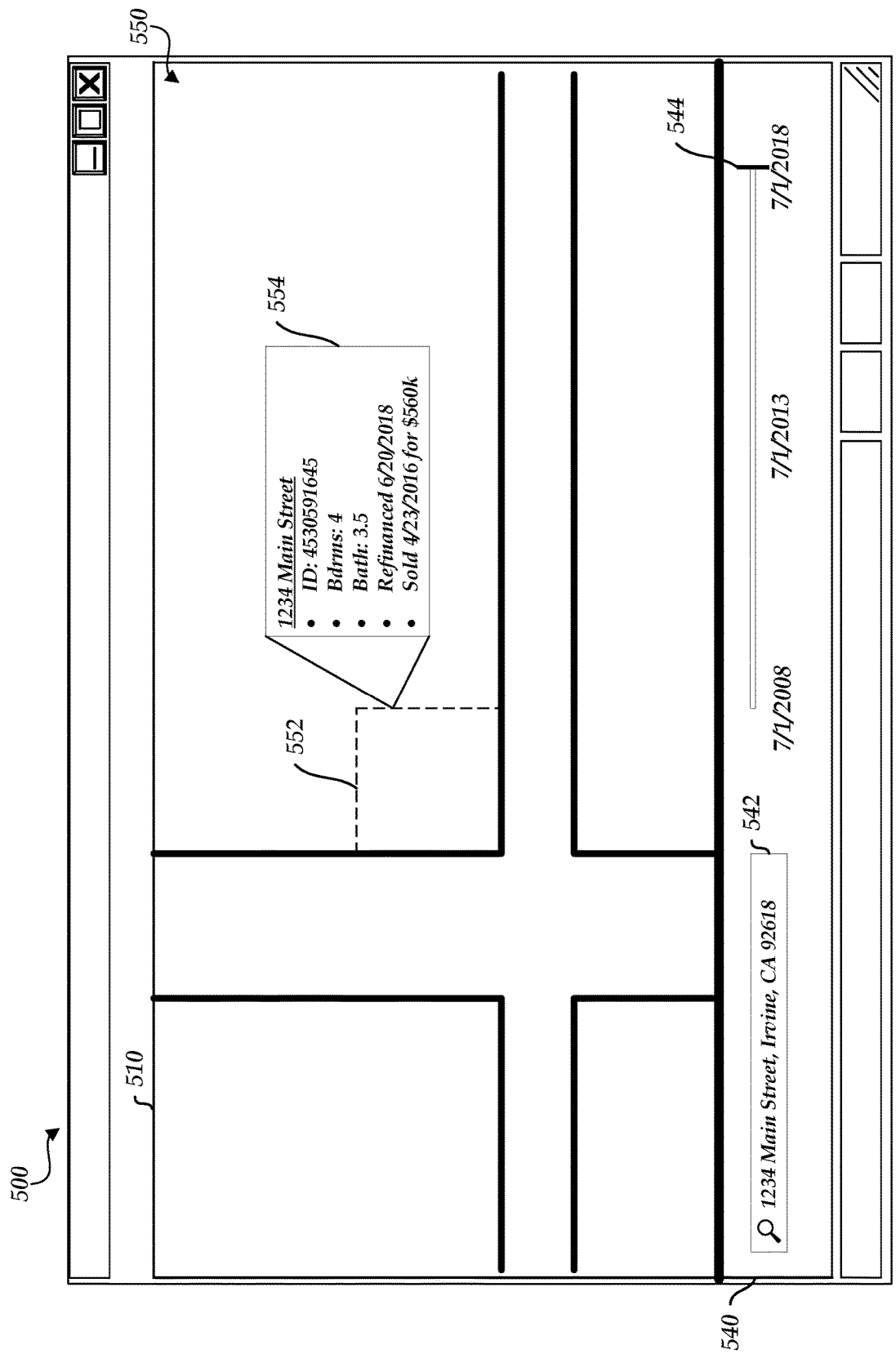
FIGS. 5A-5B illustrate an example user interface depicting property attribute values for a property requested by a user via a user device.
Figure 5B:
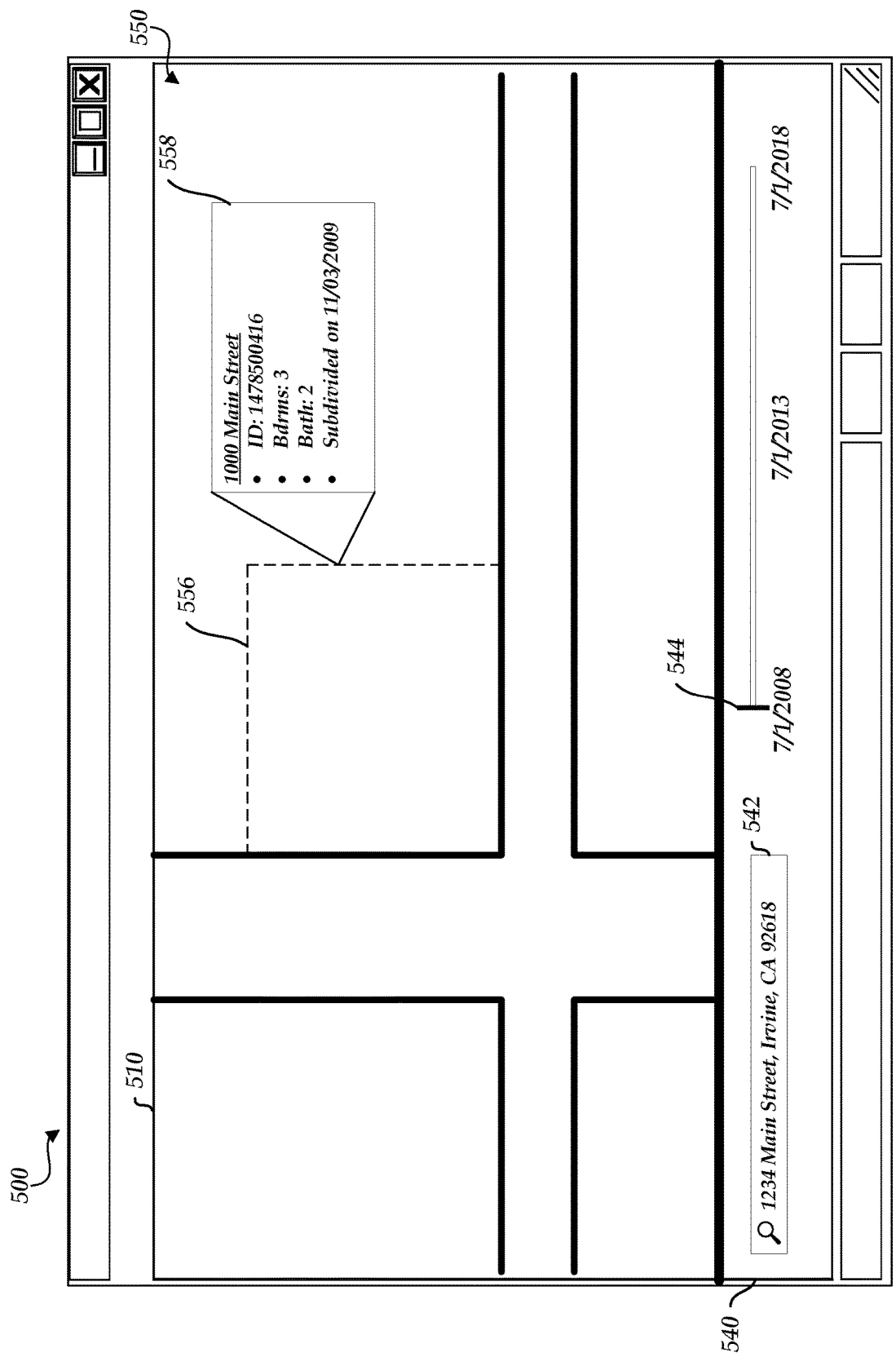

FIGS. 5A-5B illustrate an example user interface 500 depicting property attribute values for a property requested by a user via a user device 102. The user interface 500 may be rendered and displayed on a user device 102 based on user interface data generated by the user interface generator 127 of the data linking system 120.

As illustrated in FIG. 5A, the user interface 500 includes a window or frame 510 depicting a geographic map 550. The user interface 500 further includes a window or frame 540 that includes a search field 542 and a slider bar 544. A user may enter information describing a property in the search field 542. For example, the property information can be any property attribute value. In response to the user entering the property information, the user device 102 may transmit the information to the data linking system 120 (e.g., the user interface generator 127). The user interface generator 127 may then use the transmitted property information to query the master record data store 129 and identify the property corresponding to the provided property attribute values, and subsequently identify additional property attribute values and/or other information (e.g., information stored in the various tables of the master record data store 129, such as record history, event history, etc.) of that property in a manner as described above. The user interface generator 127 can then forward these identified property attribute values in the form of user interface data to the user device 102, which can update the user interface 500 to display the identified property attribute values, as shown in box 554.

For example, based on the identified property attribute values, the geographic map 550 may be updated to include an indication of a geographic location of the property (represented by box 552) as well as a visualization of the property attribute values (as listed in box 554). FIG. 5A illustrate a box 554 as a pop-up or tooltip window showing the property attribute values, but the property attribute values can be displayed in any other type of manner.

As described above, a property can be split, merged, become inactive, etc. The master record data store 129 (e.g., the master event history table) may have a record of such events, with the unique identifier of the original property linked to the unique identifier of the split property, the unique identifier of the original property linked to the unique identifier of the merged property, etc. Thus, the user interface data generated by the user interface generator 127 may include this information, including the property attribute values of the property with a unique identifier linked to the unique identifier of the subject property. Accordingly, a user can move the slider 544 to view how the property has changed over time, if at all.

For example, as illustrated in FIG. 5B, a user has moved the slider 544 from a position corresponding to Jul. 1, 2018 to a position corresponding to Jul. 1, 2008. In response, the user interface 500 is updated to depict a new box 556 in the map 550 that represents the location and size of the property searched for by the user 10 years prior. As shown in FIG. 5B, the property searched for by the user (e.g., 1234 Main St.) was larger in 2008 and had a different address (e.g., 1000 Main St.). The property attribute values of the larger property are also different (as shown in box 558), with the box 558 indicating that the property was subdivided in 2009 to form the property searched for by the user as well as potentially other properties.

A user interface generally has a finite amount of space. However, the user interface 500 is structured with pop-up windows (e.g., boxes 554 and 558), a slider 544, and/or other features that dynamically show the user information about a property and information about related properties (e.g., a parent property, a child property, etc.) despite this finite amount of space.

In addition, the user interface 500 is structured in a manner to reduce the number of navigational steps that a user may need to perform to view desired property information. For example, with the user interface 500 the user only has to enter a single search query to view information about multiple properties. In prior user interfaces, a user may have to enter a different search query for each desired property or navigate through different windows or pages to view the same information as is available in the user interface 500, even if the properties have a parent or child relationship.

While the user interface 500 is illustrated as having a slider 544, this is not meant to be limiting. The user interface 500 could instead include a dropdown box, a menu, or other like user interface features to allow a user to switch between viewing the searched-for property and a related property.

Figure 6:
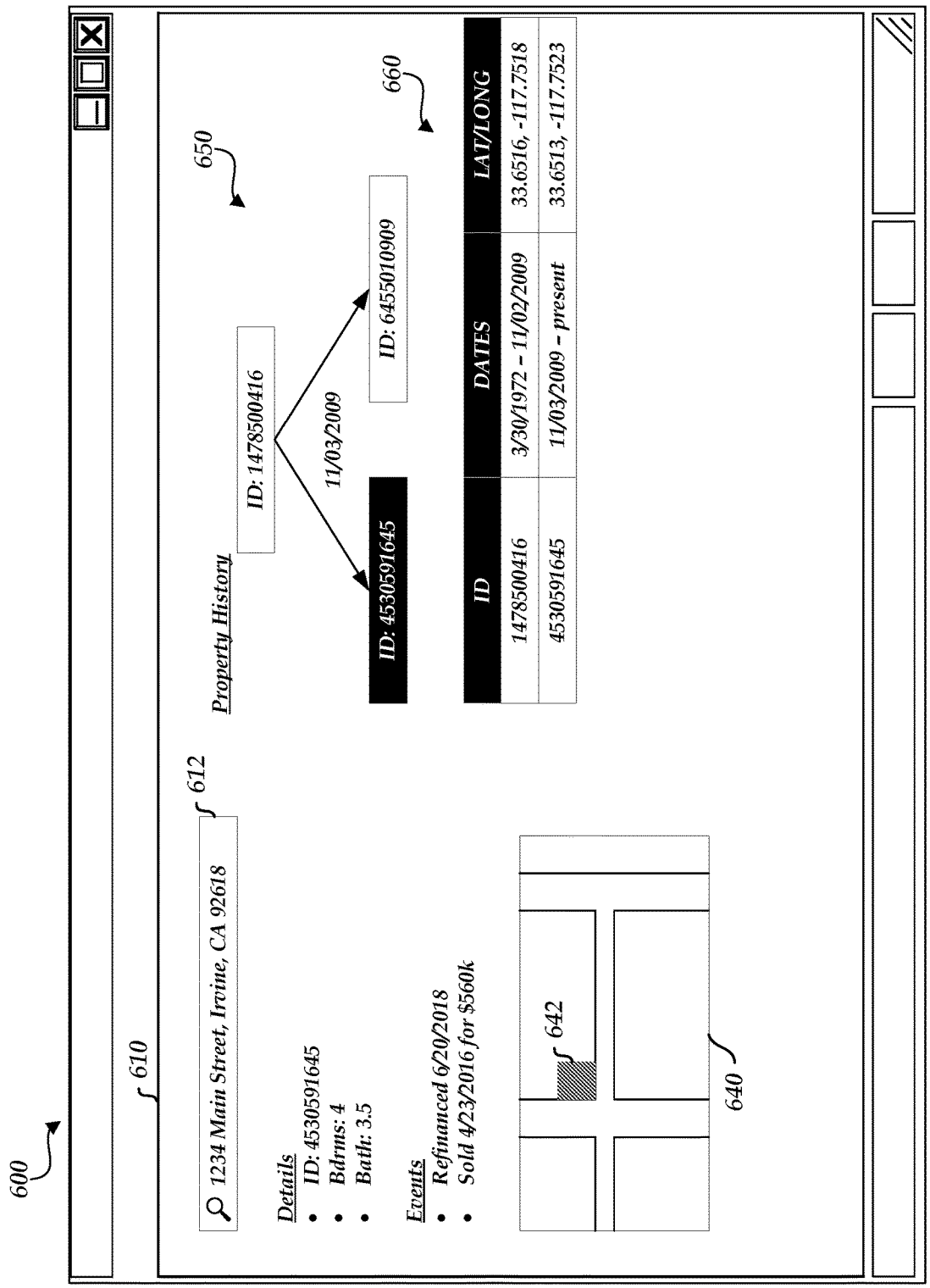
FIG. 6 illustrates another example user interface depicting property attribute values for a property requested by a user via a user device.

FIG. 6 illustrates another example user interface 600 depicting property attribute values for a property requested by a user via a user device 102. The user interface 600 may be rendered and displayed on a user device 102 based on user interface data generated by the user interface generator 127 of the data linking system 120.

As illustrated in FIG. 6, the user interface 600 includes a window or frame 610 depicting property attribute values for a property searched for by a user using search field 612. The user interface 600 further includes a geographic map 640 depicting a location of the property (as represented by box 642), a property history graph 650, and/or a property history table 660. The property history graph 650 and/or the property history table 660 may be other ways in which the user interface 600 can display information related to a searched-for property and any properties related to the searched-for property given the finite amount of space available in a user interface and in a manner that can reduce the number of navigational steps a user has to perform to view desired property information.

As shown in the property history graph 650, a property referenced by unique identifier 1478500416 may have been subdivided into two properties on Nov. 3, 2009: a property with unique identifier 4530591645 and a property with unique identifier 6455010909. The property history graph 650 may further highlight or otherwise identify the property in the graph that the user searched for (e.g., here, the user searched for a property with the unique identifier 4530591645).

The property history table 660 may include additional information, such as the dates that a property was active (e.g., before it was subdivided, merged, destroyed, etc.) and the approximate geographic coordinates (or spatial boundaries) of the property.

Example Entity Matching Engine Service

Figure 7:
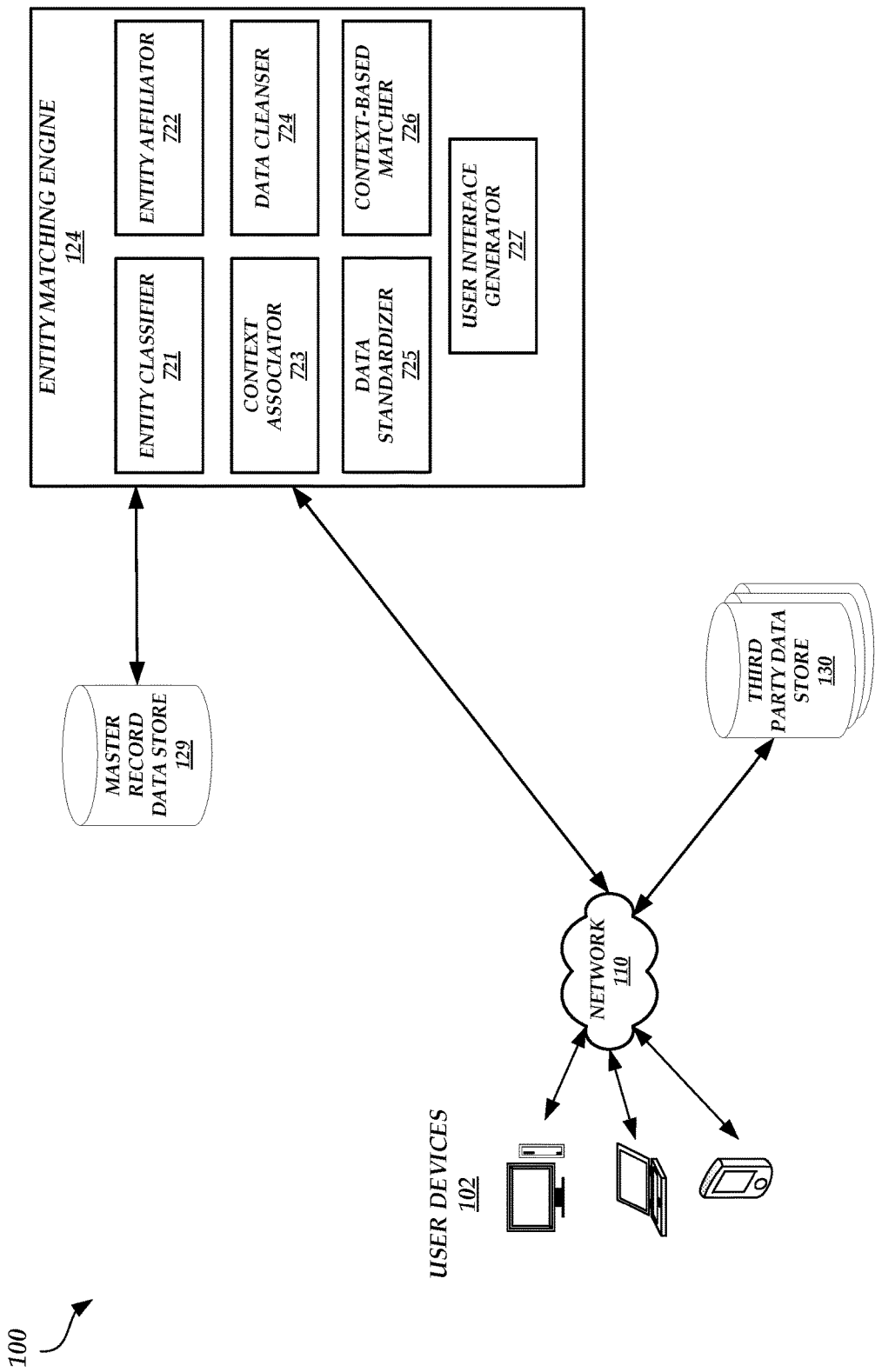
FIG. 7 is a more detailed block diagram of the entity matching engine of FIG. 1.

FIG. 7 is a more detailed block diagram of the entity matching engine 124. As described herein, the entity matching engine 124 can perform pre-processing operations, which are described herein with respect to FIG. 7. In addition, the entity matching engine 124 can operate as a standalone, network-accessible service. For example, a user device 102 can send a request to the entity matching engine 124 to identify a data record that matches a data record included in the request. Thus, the entity matching engine 124, as a service, can be used by user devices 102 to identify matches for property data records, financial data records, vehicle data records, and/or any other types of data records.

The entity matching engine 124 may include various modules, components, data stores, and/or the like to provide the data matching functionality described herein. For example, the entity matching engine 124 may include an entity classifier 721, an entity affiliator 722, a context associator 723, a data cleanser 724, a data standardizer 725, a context-based matcher 726, and a user interface generator 727.

The entity classifier 721 may receive a data record (e.g., from the MVR checker 123, from a user device 102, etc.) and use artificial intelligence to identify one or more entities in the data record. An entity can be a person, a house, and/or the like. For example, the entity classifier 721 may train a machine learning model to identify entities based on a training dataset (e.g., data records in which entities are labeled) or generate a database that includes a mapping identifying different types of values that may be present in a data record and whether such values represent entities. The entity classifier 721 can then apply a received data record as an input to the trained machine learning model, which produces a list of probable entities, or can query the database using property attribute values included in the data record to identify possible entities. The machine learning model can be continuously or periodically updated or retrained (e.g., by the entity classifier 721) based on user feedback that is converted into training data with labels to identify situations in which entities were correctly and incorrectly identified. The use of user feedback to update or retrain the machine learning model may be gradually reduced as the machine learning model becomes more accurate.

The entity affiliator 722 can then identify a relationship between the identified entities. In the context of real property, a relationship between two entities could be, for example, that a first entity (e.g., a person) is buying (or selling, renting, etc., which is the relationship) a second entity (e.g., a house). For example, the entity affiliator 722 may train a machine learning model to identify a relationship between entities based on a training dataset (e.g., data records in which entities and the relationships of such entities are labeled) or generate a database that includes a mapping identifying different types of entities that may be present in data record and possible relationships of such entities. The entity affiliator 722 can then apply the identified entities and a received data record as an input to the trained machine learning model, which produces a list of probable relationships, or can query the database using property attribute values included in the data record and/or the identified entities to identify possible relationships. The machine learning model can be continuously or periodically updated or retrained (e.g., by the entity affiliator 722) based on user feedback that is converted into training data with labels to identify situations in which relationships were correctly and incorrectly identified. The use of user feedback to update or retrain the machine learning model may be gradually reduced as the machine learning model becomes more accurate.

The context associator 723 can identify a context of the received data record, given the entities and the relationship between the entities. In the context of real property, a context may be that a first entity (e.g., a person) gets a mortgage (e.g., the context) to buy a second entity (e.g., a house). For example, the context associator 723 can train a machine learning model using supervised and/or unsupervised techniques. In the supervised example, the context associator 723 can train the machine learning model using training data that includes data records in which entities, relationships between entities, and the context of such relationships are labeled. In the unsupervised example, the machine learning model initially trained by the context associator 723 can use graphing techniques to infer relationships between entities and/or contexts. The context associator 723 can apply the data record, the identified entities, and/or the identified relationships as an input to the trained machine learning model to determine probable contexts. The machine learning model can be continuously or periodically updated or retrained (e.g., by the context associator 723) based on user feedback that is converted into training data with labels to identify situations in which contexts were correctly and incorrectly identified. The use of user feedback to update or retrain the machine learning model may be gradually reduced as the machine learning model becomes more accurate.

Alternatively or in addition, the context associator 723 can identify a context of the received data record based on the property attribute values included therein. For example, the context associator 723 may have generated a database with mappings between property attribute values and corresponding contexts. As an illustrative example, a data record with a loan amount, a monthly payment, etc. may be mapped to a mortgage context. The context associator 723 can query the database using the property attribute values included in the received data record to obtain a probable context.

The entity classifier 721, the entity affiliator 722, and the context associator 723 may not modify the data record, but these components may inform the data cleanser 724 and/or the data standardizer 725 how to modify the data record, if appropriate, and may inform the context-based matcher 726 how to perform a match. For example, the data cleanser 724 can, using a set of rules, remove excess characters from the data record (e.g., extra whitespaces, periods, commas, colons, etc.).

The data cleanser 724 can also use a set of rules to modify certain property attribute values. For example, the rules may identify a range of acceptable values for certain property attributes. As an illustrative example, the rules may identify that the number of bedrooms in a property can be between 0 and 30. If a data record indicates that the property has 100 bedrooms, the data cleanser 724 can modify this property attribute value to the highest allowable value (e.g., 30) (or the lowest allowable value if the original value falls below the acceptable range). Alternatively, the data cleanser 724 can simply erase the original value, leaving the value empty. The rules implemented by the data cleanser 724 may be chosen by the data cleanser based on the identified entities, relationships, and/or context.

The data standardizer 725 can standardize the data record. For example, the data standardizer 725 can rename column names to match a standard name, reformat abbreviations or codes into a standard format (e.g., change "BDR" to "BDRMS"), standardize legal names (e.g., include periods after each middle initial such that a data record with "John H Smith" becomes "John H. Smith"), standardize addresses (e.g., use 9 digit zip codes instead of 5 digit zip codes), and/or the like.

The data cleanser 724 and the data standardizer 725 implement pre-processing operations to place the data record in a better condition for obtaining a match, thereby improving the entity matching engine 124 match rate. Thus, the data cleanser 724 and the data standardizer 725 can improve the match rate, and therefore reduce further processing implemented by other systems that obtain data from the entity matching engine 124 and/or the data linking system 120.

Once the data record is cleansed and standardized, the data standardizer 725 can send the potentially modified data record to the context-based matcher 726. The context-based matcher 726 may implement the tiered approach discussed above, using information from the master record data store 129, to identify a possible match. The context-based matcher 726 can output a matching data record or unique identifier, transmitting this information to the user device 102 and/or the user interface generator 727.

The user interface generator 727 can generate user interface data that, when rendered by a user device 102, causes the user device to display a user interface depicting information identifying the match (if a match occurs) or indicating that no match occurred. The user interface may be similar to the user interfaces 500 and 600 discussed above.

Example Block Diagrams for Preparing a Data Record to be Matched

Figure 8A:
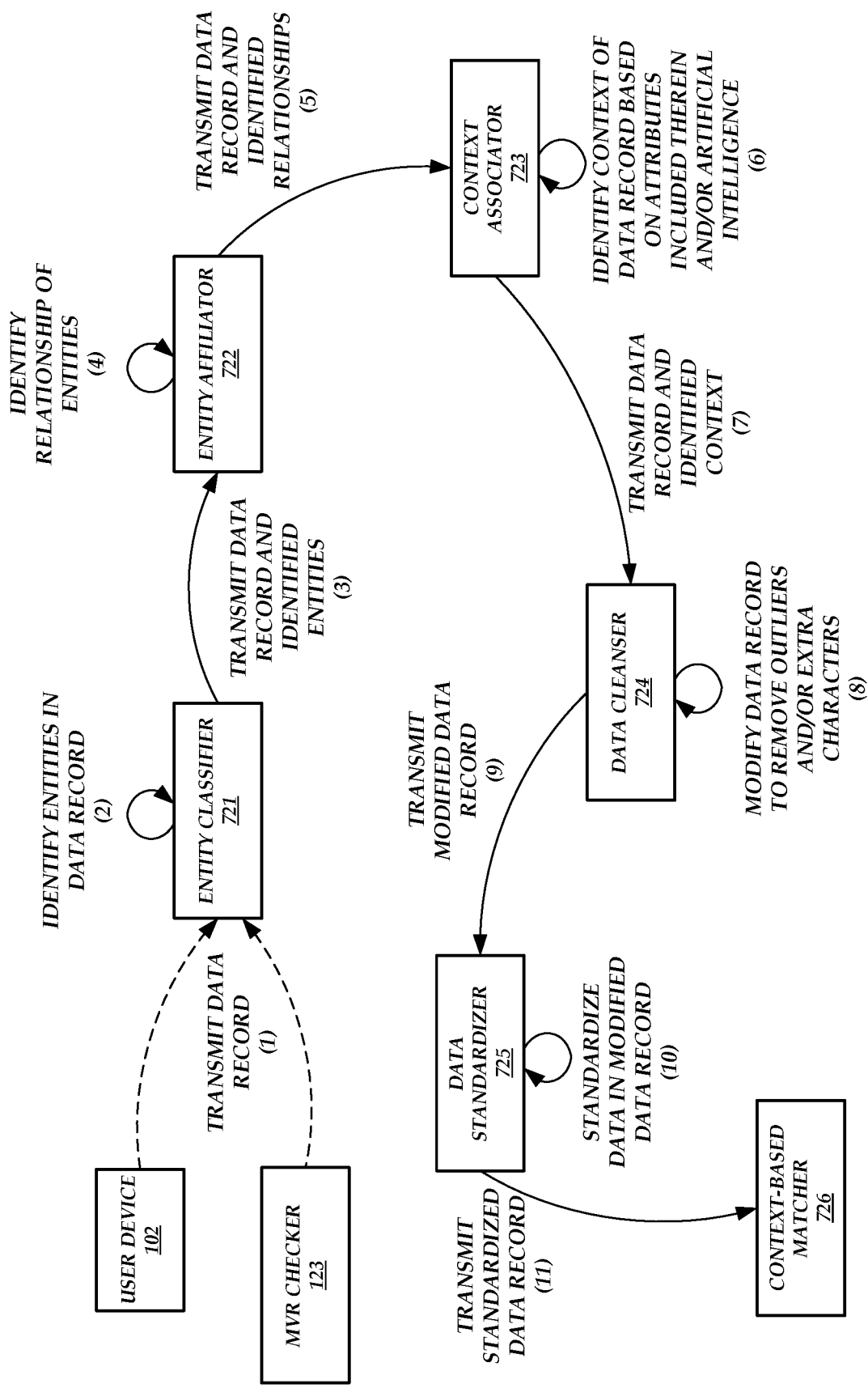
FIGS. 8A-8B are flow diagrams illustrating the operations performed by the components of the entity matching engine of FIGS. 1 and 7 to prepare a data record to be matched and to perform the matching.
Figure 8B:
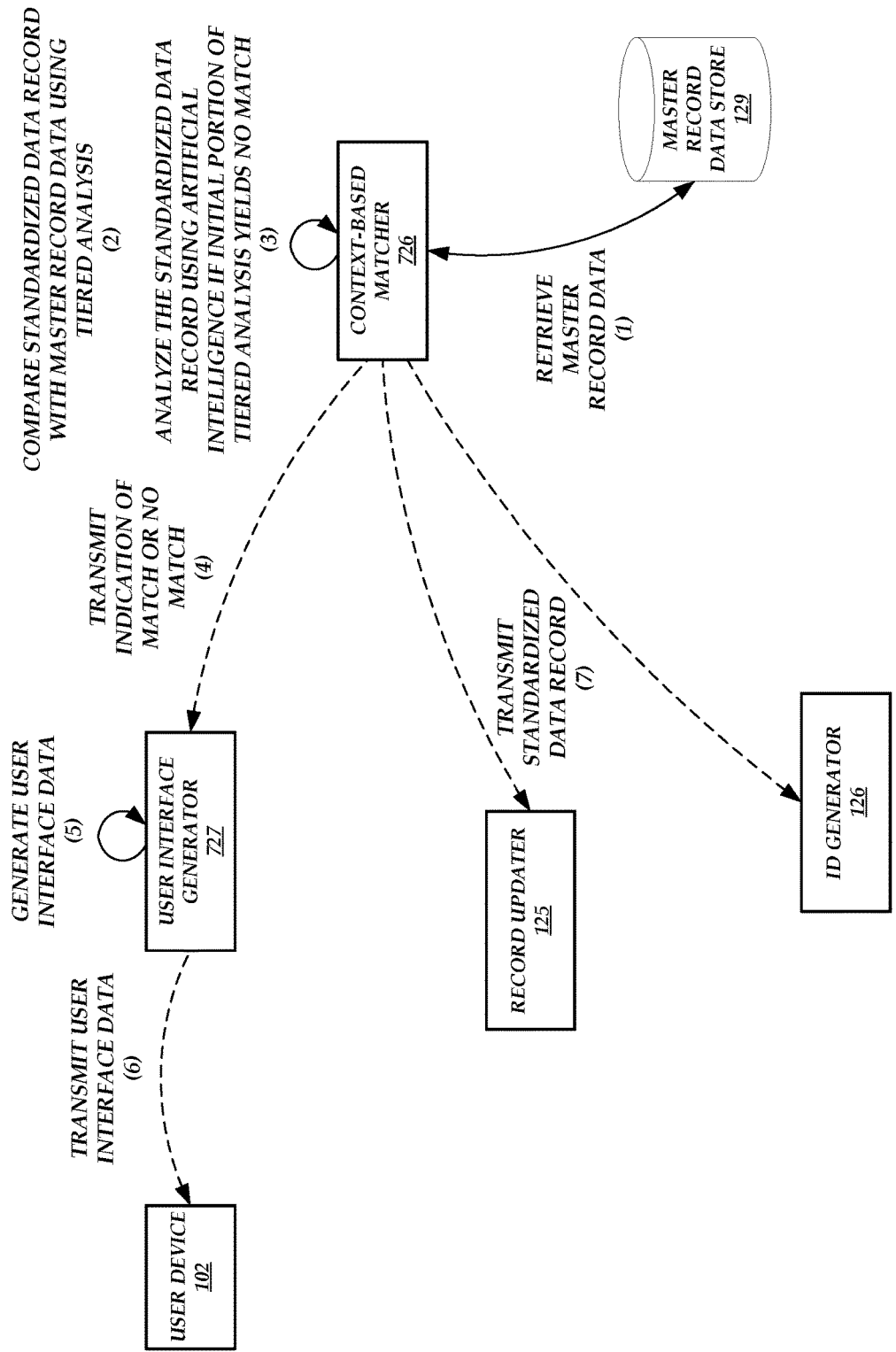

FIGS. 8A-8B are flow diagrams illustrating the operations performed by the components of the entity matching engine 124 of FIGS. 1 and 7 to prepare a data record to be matched and to perform the matching. As illustrated in FIG. 8A, the entity classifier 721 receives a data record transmitted by a user device 102 (e.g., via the network 110) or by the MVR checker 123 at (1). In response, the entity classifier 721 identifies entities in the data record at (2). For example, the entity classifier 721 can use a trained machine learning model to identify possible entities. The entity classifier 721 then transmits the data record and the identified entities to the entity affiliator 722 at (3).

The entity affiliator 722 identifies a relationship of the identified entities. For example, the entity affiliator 722 can use a trained machine learning model, providing the identified entities as an input, to identify possible relationship(s). The entity affiliator 722 can then transmit the data record, the identified entities, and/or the identified relationships to the context associator 723 at (5).

The context associator 723 can identify a context of the data record based on property attribute values included in the data record and/or based on artificial intelligence at (6). For example, the context associator 723 can use a trained machine learning model, providing the identified entities, the identified relationships, and/or the property attribute values as inputs, to identify a possible context. Alternatively or in addition, the context associator 723 can query a database in which entities and/or relationships are mapped to contexts to identify a possible context. Once identified, the context associator 723 can transmit the data record, identified entities, identified relationships, and/or identified context to the data cleanser 724 at (7).

The data cleanser 724 can cleanse the data record. For example, the data cleanser 724 can use the identified context to identify a set of rules that are used to modify the data record to remove outliers (e.g., property attribute values that fall outside an acceptable range of values) and/or to remove extra characters (e.g., extra whitespaces, extra punctuation, etc.) at (8). The data cleanser 724 may not always modify the data record (e.g., if the data record does not include any outliers or extra characters), but the data cleanser 724 is illustrated as modifying the data record in FIG. 8A for illustrative purposes. Once the data record is analyzed and modified, the data cleanser 724 transmits the modified data record to the data standardizer 725 at (9).

The data standardizer 725 standardizes data in the modified data record at (10). For example, the data standardizer 725 can rename column headers, convert abbreviations or codes into a common format, standardize names, standardize physical street addresses, and/or the like. The data standardizer 725 may not always modify the data record (e.g., if the data record conforms to a standard format), but the data standardizer 725 is illustrated as modifying the data record in FIG. 8A for illustrative purposes. Once the data record is analyzed and modified, the data standardizer 725 transmits the standardized data record to the context-based matcher 726 at (11).

As illustrated in FIG. 8B, the context-based matcher 726 can attempt to identify a match to the standardized data record and provide an indication of whether a match occurred or did not occur to the user device 102 or to a component of the data linking system 120. For example, the context-based matcher 726 can retrieve master record data from the master record data store 129 at (1). For example, the master record data can be data from any of the tables stored in the master record data store 129.

The context-based matcher 726 can then compare the standardized data record with the master record data using a tiered analysis at (2). For example, the context-based matcher 726 can compare the property attribute values in the standardized data record with property attribute values present in the master record according to the rules in a first tier. If no match is identified (e.g., the property attribute values in the standardized data record analyzed in the first tier do not match any entry in the master record table, for example), then the context-based matcher 726 attempts to identify a match according to the rules in a second tier, and so on. If the first four tiers do not result in a match, then the context-based matcher 726 analyzes the standardized data record using artificial intelligence to attempt to identify a match at (3). If using artificial intelligence yields at least one match, the context-based matcher 726 may further analyze the match(es) in an attempt to remove false positives generated by the artificial intelligence. As an example, a match output by the context-based matcher 726 can be a unique identifier, another data record, a property attribute value of a property, and/or the like.

Optionally, if the user device 102 is the device that originally provided the data record for matching purposes, the context-based matcher 726 transmits an indication of a match or no match to the user interface generator 727 at (4). The user interface generator 727 can then generate user interface data at (5) that, when rendered, causes the user device 102 to display an interactive user interface in which a user can view the match (or an indication that no match occurred) and potentially related information (e.g., information identifying a parent or child property). The user interface generator 727 can then transmit the user interface data to the user device 102 at (6).

Optionally, if the data linking system 120 uses the entity matching engine 124 to identify a match to a data record obtained from a third party data store 130, the context based-matcher 726 transmits at (7) the standardized data record and/or an identified unique identifier to the record updater 125 if there is a match, or the standardized data record to the ID generator 126 if there is no match.

Example Data Linking Routine

Figure 9:
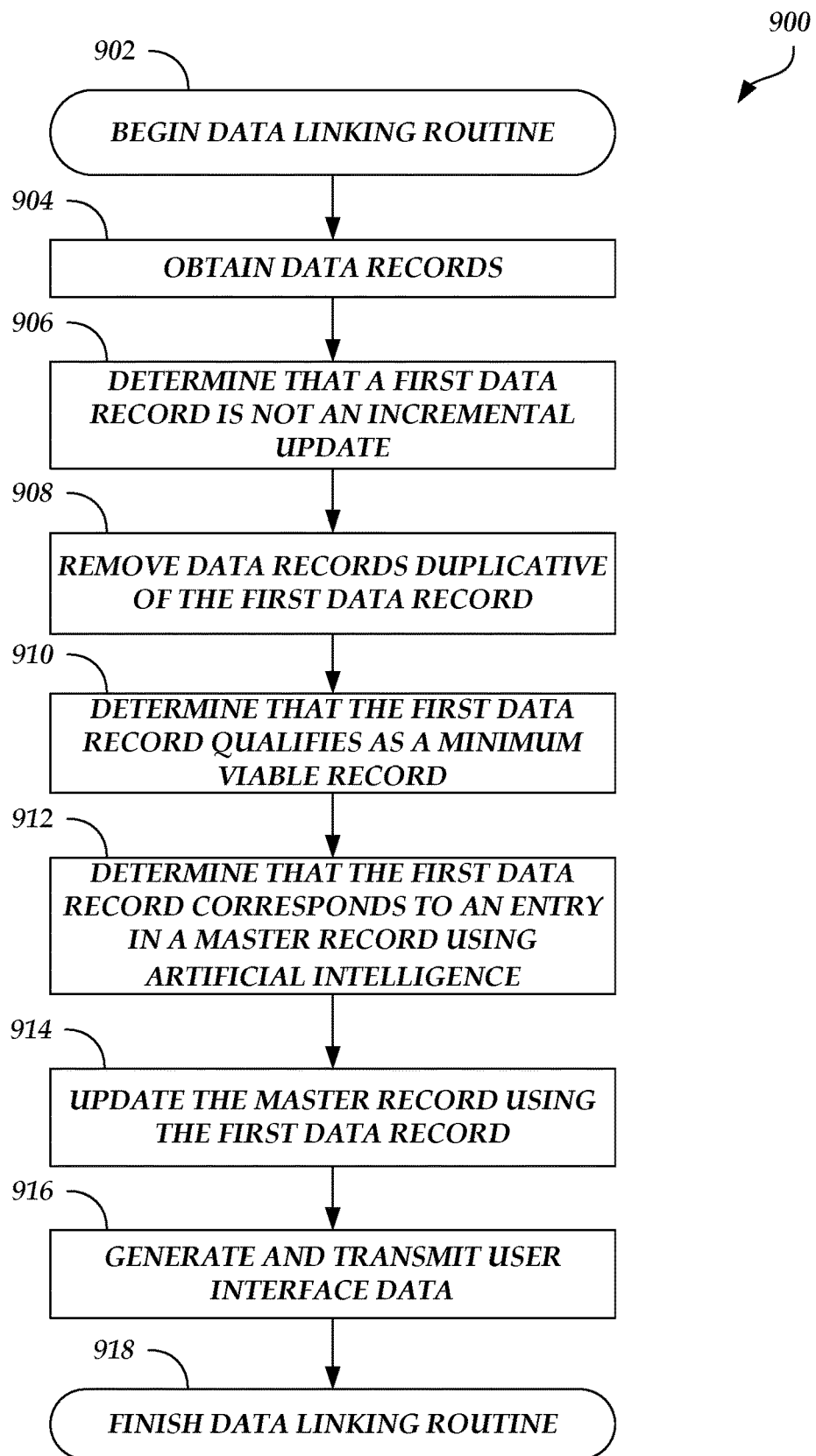
FIG. 9 is a flow diagram depicting a data linking routine illustratively implemented by a data linking system, according to one embodiment.

FIG. 9 is a flow diagram depicting a data linking routine 900 illustratively implemented by a data linking system, according to one embodiment. As an example, the data linking system 120 of FIG. 1 can be configured to execute the data linking routine 900. The data linking routine 900 begins at block 902.

At block 904, data records are obtained. For example, the data records can be obtained from one or more third party data stores 130.

At block 906, a determination is made that a first data record in the obtained data records is not an incremental update. For example, the first data record may be an incremental update to another data record if the first data record included a label, annotation, or other metadata linking the data record to a previous data record.

At block 908, data records duplicative of the first data record are removed. For example, data records in the obtained data records may be duplicative of the first data record if these data records all correspond to the same property and/or include the same property attribute values. By removing the duplicative data records, the data linking system 120 can minimize the number of operations that are performed that yield the same result (e.g., a match to the same unique identifier).

At block 910, a determination is made that the first data record qualifies as a minimum viable record. For example, the first data record may qualify as a minimum viable record if the first data record includes a minimum number of property attribute values.

At block 912, a determination is made that the first data record corresponds to an entry in a master record using artificial intelligence. For example, the data linking system 120 may implement a tiered approach or analysis to evaluate whether the first data record matches any entry in the master record table (e.g., corresponds to the same property as an entry in the master record table). The first four tiers of the tiered approach may not yield a match, but a trained machine learning model, which receives the first data record and some or all of the data in the master record data store 129 as an input, may identify one or more possible matches. The identified match(es) may be represented as unique identifiers.

At block 914, the master record is updated using the first data record. For example, the data linking system 120 may determine that the first data record includes property attribute values that are newer than those included in the master record table. Thus, the master record table can be updated to include the newer property attribute values of the first data record.

At block 916, user interface data is generated and transmitted. For example, the user interface data can be generated using some or all of the data in the master record data store 129 corresponding to the unique identifier identified as a match. A user device 102 can then use the user interface data to render and display an interactive user interface that allows a user to view property attribute values for a searched-for property and/or any properties related to the searched-for property. After the user interface data is generated and transmitted, the data linking routine 900 ends, as shown at block 918.

Example Data Matching Routine

Figure 10:
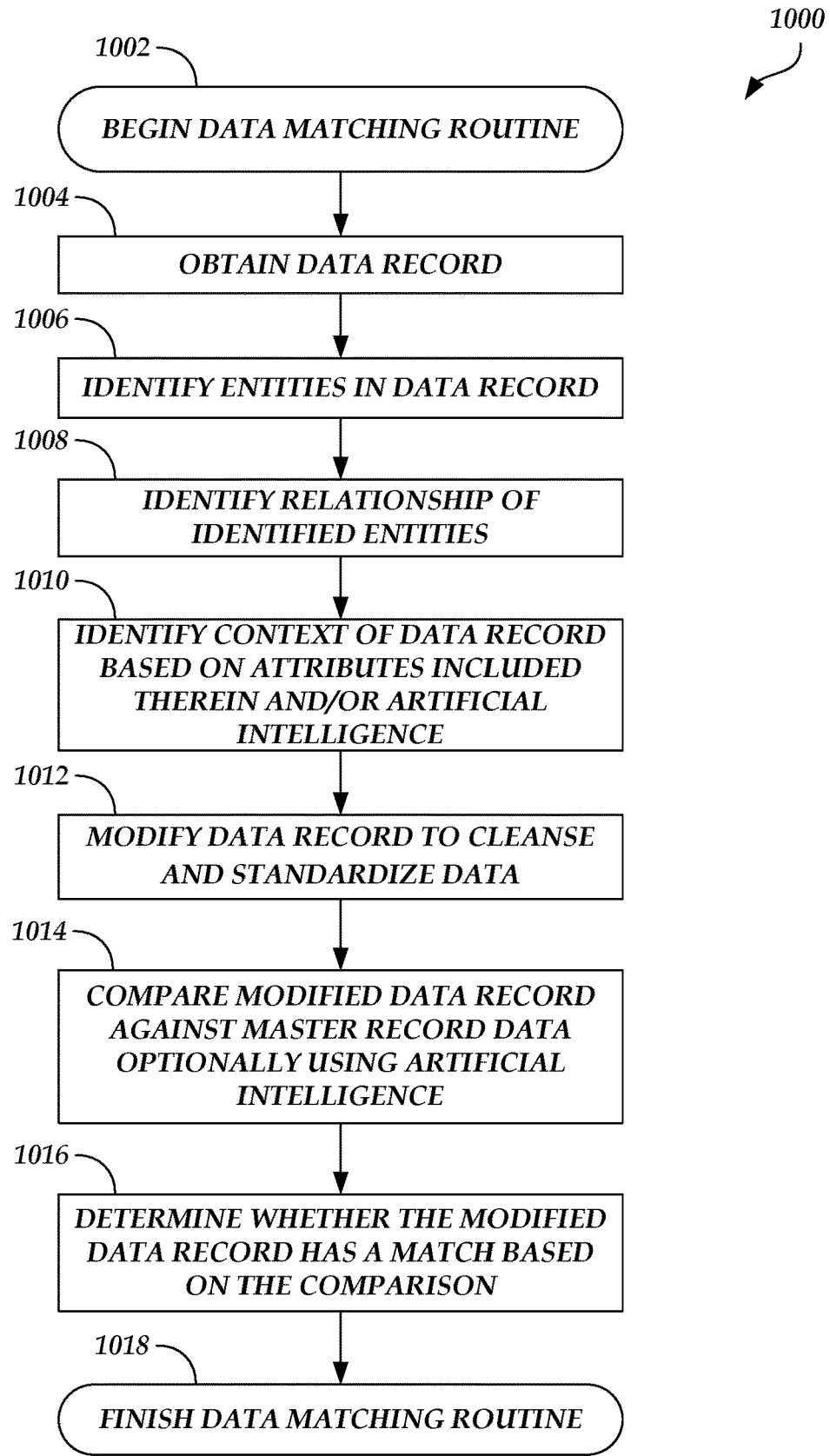
FIG. 10 is a flow diagram depicting a data matching routine illustratively implemented by an entity matching engine, according to one embodiment.

FIG. 10 is a flow diagram depicting a data matching routine 1000 illustratively implemented by an entity matching engine, according to one embodiment. As an example, the entity matching engine 124 of FIG. 1 can be configured to execute the data matching routine 1000. The data matching routine 1000 begins at block 1002.

At block 1004, a data record is obtained. For example, the data record can be obtained from a user device 102 or another component of the data linking system 120 (e.g., the MVR checker 123).

At block 1006, entities in the data record are identified. For example, a trained machine learning model can be used to identify the entities in the data record.

At block 1008, a relationship of the identified entities is identified. For example, another trained machine learning model can be used to identify the relationship given the identified entities and/or the data record as an input to the model.

At block 1010, a context of the data record is identified based on property attribute values included in the data record and/or artificial intelligence. For example, a database may be available that includes a mapping between entities, certain relationships, and/or corresponding contexts. As another example, a machine learning model may be trained, using supervised or unsupervised techniques, to identify contexts given a data record, entities, and/or relationships.

At block 1012, a data record is modified to cleanse and standardize the data included therein. For example, outlier property attribute values can be modified or removed altogether, extra characters can be removed, columns can be renamed, abbreviations or codes can be translated into a common format, names can be standardized, physical street addresses can be standardized, and/or the like. Modifying the data record prior to attempting to identify a match may increase the match rate, and ultimately improve the computing performance of the entity matching engine 124, the data linking system 120, a user device 102, and/or an external system (not shown).

At block 1014, the modified data record is compared against master record data optionally using artificial intelligence. For example, artificial intelligence may be used to perform the comparison and attempt to identify a match between the modified data record and another data record and/or a unique identifier if other comparisons in a tiered analysis fail to yield a match.

At block 1016, a determination is made as to whether the modified data record has a match based on the comparison. Once the determination is made, the entity matching engine 124 can forward the results to the user device 102, the user interface generator 727, the record updater 125, and/or the ID generator 126. After the determination is made, the data matching routine 1000 ends, as shown at block 1018.

Additional Embodiments

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user to search for information on a property and view the results, and/or to provide a data record and view unique identifiers and/or other data records that potentially match the provided data record.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The machine learning models disclosed herein can implement any one of the following algorithms: a neural network algorithm, a Support Vector Machine algorithm, a Probabilistic Graphic Model algorithm, a Decision Tree model algorithm, an extreme gradient boost (XGboost), a generalized logistic regression, canopy clustering, active learning, random forest, and/or the like. Such algorithms cannot be performed by a human due to the fact that machine learning involves the iterative learning from data. A computing device that uses a machine learning algorithm to perform an action is not programmed by a human with explicit instructions that cause the action to be performed. Rather, a computing device that uses a machine learning process to perform an action makes decisions or predictions in the course of performing the action based on a model learned or trained using sample data. Thus, there is not a known set of instructions that a human could simply follow to mimic the actions performed using a machine learning process.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by one or more processor devices, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for matching data records, the system comprising:
 a master record data store configured to store data associated with a plurality of properties; and
 a computing system comprising one or more computing devices, wherein the computing system is configured to communicate with the master record data store and is configured with specific computer-executable instructions to at least:
  train a first machine learning model with one or more feature-based representations each associated with a data record pair and labeled with an indication of whether the respective data record pair is a match;
  process a request received from a user device via a network, wherein the request specifies a data record;
  identify a first entity and a second entity in the data record;
  identify a relationship between the first entity and the second entity;
  identify a context associated with the first entity, the second entity, and the identified relationship using a trained machine learning model trained with one or more data records labeled to identify corresponding contexts;
  cleanse and standardize data in the data record using one or more rules selected based on the identified context to form a modified data record;
  determine that a first property in the plurality of properties shares a first property attribute value with the modified data record;
  generate a first feature-based representation of a combination of property attribute values of the modified data record and property attribute values of the first property;
  determine that the modified data record and the first property have a match probability above a threshold value based on an application of the first feature-based representation as an input to the trained first machine learning model; and output an indication of the determination such that the user device receives an indication that the data record matches the first property.

2. The system of claim 1, wherein the indication received by the user device is a user interface, and wherein the user interface depicts property attribute values of the first property.

3. The system of claim 2, wherein the first property is a child property of a second property in the plurality of properties, and wherein the user interface further depicts a slider that, when moved from a date after creation of the first property to a date before the creation of the first property, causes the user interface to update to depict property attribute values of the second property.

4. The system of claim 1, wherein the computing system is further configured with specific computer-executable instructions to at least:

compare a second property attribute value in the data record with a range of acceptable values;

determine that the second property attribute value is outside the range; and remove the second property attribute value from the data record.

5. The system of claim 1, wherein the computing system is further configured with specific computer-executable instructions to at least remove extra characters from the data record.

6. The system of claim 1, wherein the computing system is further configured with specific computer-executable instructions to at least:

identify a first entity and a second entity in the data record using a second trained machine learning model; and identify a relationship between the first entity and the second entity based on an application of the first entity and the second entity as inputs to a third trained machine learning model.

7. The system of claim 1, wherein the one or more data records labeled to identify corresponding contexts comprises data records in which entities, relationships between the entities, and the context of the relationships are labeled.

8. The system of claim 1, wherein the computing system is further configured with specific computer-executable instructions to at least:

determine that a second property in the plurality of properties shares the first property attribute value with the modified data record;

generate a second feature-based representation of a combination of property attribute values of the modified data record and property attribute values of the second property; and determine that the modified data record and the second property have a match probability below the threshold value based on an application of the second feature-based representation as an input to the first trained machine learning model.

9. A computer-implemented method of matching data records, the method comprising:

as implemented by one or more computing devices configured with specific computer-executable instructions, training a first machine learning model with one or more feature-based representations each associated with a data record pair and labeled with an indication of whether the respective data record pair is a match;

obtaining a data record;

identifying a context associated with the data record using a trained machine learning model trained with one or more data records labeled to identify corresponding contexts;

cleansing data in the data record using one or more rules selected based on the identified context to form a modified data record;

standardizing data in the modified data record to form a second modified data record;

determining that a first property in the plurality of properties shares a first property attribute value with the modified data record;

generating a first feature-based representation of a combination of property attribute values of the modified data record and property attribute values of the first property;

determining that the second modified data record and the first property have a match probability above a threshold value based on an application of the first feature-based representation as an input to the trained first machine learning model; and causing output of an indication that the data record matches the first property.

10. The computer-implemented method of claim 9, wherein the indication is a user interface, and wherein the user interface depicts property attribute values of the first property.

11. The computer-implemented method of claim 10, wherein the first property is a child property of a second property, and wherein the user interface further depicts a slider that, when moved from a date after creation of the first property to a date before the creation of the first property, causes the user interface to update to depict property attribute values of the second property.

12. The computer-implemented method of claim 9, wherein cleansing data further comprises:

comparing a second property attribute value in the data record with a range of acceptable values;

determining that the second property attribute value is outside the range; and removing the second property attribute value from the data record.

13. The computer-implemented method of claim 9, wherein cleansing data further comprises removing extra characters from the data record.

14. The computer-implemented method of claim 9, further comprising:

determining that a second property shares the first property attribute value with the second modified data record;

generating a second feature-based representation of a combination of property attribute values of the second modified data record and property attribute values of the second property; and determining that the second modified data record and the second property have a match probability below the threshold value based on an application of the second feature-based representation as an input to the first trained machine learning model.

15. Non-transitory, computer-readable storage media comprising computer-executable instructions for matching data records, wherein the computer-executable instructions, when executed by a computer system, cause the computer system to:

train a first machine learning model with one or more feature-based representations each associated with a data record pair and labeled with an indication of whether the respective data record pair is a match;

obtain a data record;

identify a context associated with the data record using a trained machine learning model trained with one or more data records labeled to identify corresponding contexts;

modify the data record using one or more rules selected based on the identified context to improve a match rate;

determine that a first property in the plurality of properties shares a first property attribute value with the modified data record;

generate a first feature-based representation of a combination of property attribute values of the modified data record and property attribute values of the first property;

determine that the modified data record and the first property have a match probability above a threshold value based on an application of the first feature-based representation as an input to the trained first machine learning model; and generate an output that causes generation of a representation indicating that the data record matches the first property.

16. The non-transitory, computer-readable storage media of claim 15, wherein the representation is a user interface, and wherein the user interface depicts property attribute values of the first property.

17. The non-transitory, computer-readable storage media of claim 16, wherein the first property is a child property of a second property, and wherein the user interface further depicts a slider that, when moved from a date after creation of the first property to a date before the creation of the first property, causes the user interface to update to depict property attribute values of the second property.

18. The non-transitory, computer-readable storage media of claim 15, wherein the computer-executable instructions further cause the computer system to:

determine that a second property shares the first property attribute value with the modified data record;

generate a second feature-based representation of a combination of property attribute values of the modified data record and property attribute values of the second property; and determine that the modified data record and the second property have a match probability below the threshold value based on an application of the second feature-based representation as an input to the first trained machine learning model.

* * * * *